(12) United States Patent
Carlock et al.

(10) Patent No.: US 12,131,586 B2
(45) Date of Patent: Oct. 29, 2024

(54) METHODS, SYSTEMS, AND MACHINE-READABLE MEDIA FOR TRANSLATING SIGN LANGUAGE CONTENT INTO WORD CONTENT AND VICE VERSA

(71) Applicant: Sorenson IP Holdings, LLC, Taylorsville, UT (US)

(72) Inventors: John Carlock, Salt Lake City, UT (US); Conrad Maxwell, Herriman, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 309 days.

(21) Appl. No.: 17/227,235

(22) Filed: Apr. 9, 2021

(65) Prior Publication Data

US 2022/0327309 A1    Oct. 13, 2022

(51) Int. Cl.
| | | |
|---|---|---|
| *G06V 40/20* | (2022.01) | |
| *G06F 18/22* | (2023.01) | |
| *G06F 40/47* | (2020.01) | |
| *G06V 20/40* | (2022.01) | |
| *G09B 21/00* | (2006.01) | |
| *G06N 20/00* | (2019.01) | |

(52) U.S. Cl.
CPC .............. *G06V 40/28* (2022.01); *G06F 18/22* (2023.01); *G06F 40/47* (2020.01); *G06V 20/41* (2022.01); *G09B 21/009* (2013.01); *G06N 20/00* (2019.01)

(58) Field of Classification Search
CPC ...... G06V 40/28; G06V 20/41; G06V 40/174; G06V 40/23; G06F 18/22; G06F 40/47; G06F 40/284; G06F 40/56; G09B 21/009; G06N 20/00; G06N 3/0464; G06N 3/0475
See application file for complete search history.

(56) References Cited

U.S. PATENT DOCUMENTS

| | | | |
|---|---|---|---|
| 5,473,705 | A | 12/1995 | Abe et al. |
| 5,699,441 | A | 12/1997 | Sagawa et al. |
| 5,887,069 | A | 3/1999 | Sakou et al. |
| 5,953,693 | A | 9/1999 | Sakiyama et al. |
| 6,072,494 | A | 6/2000 | Nguyen |
| 6,477,239 | B1 | 11/2002 | Ohki et al. |
| 8,379,801 | B2 | 2/2013 | Romriell et al. |

(Continued)

FOREIGN PATENT DOCUMENTS

WO    WO 2011/107420    9/2011

*Primary Examiner* — Md K Talukder
(74) *Attorney, Agent, or Firm* — Maschoff Brennan

(57) ABSTRACT

Communication systems, methods, and non-transitory machine-readable storage media are disclosed herein. A communication system may include a communication device configured to receive a video stream including sign language content and any content indicators associated with the video stream during a real-time communication session within a single communication device or between a plurality of communication devices. The communication system may also include a translation engine configured to automatically translate the sign language content into word content during the real-time communication session without assistance of a human sign language interpreter. Further, the communication system may be configured to output the word content translation to a communication device during the real-time communication session.

25 Claims, 15 Drawing Sheets

(56) References Cited

U.S. PATENT DOCUMENTS

| | | |
|---|---|---|
| 8,493,174 B2 | 7/2013 | Agrawal |
| 8,610,755 B2 | 12/2013 | Brooksby et al. |
| 8,751,215 B2 | 6/2014 | Tardif |
| 8,976,940 B2 | 3/2015 | Maxwell et al. |
| 9,098,493 B2 | 8/2015 | Tardif |
| 9,215,409 B2 | 12/2015 | Montero et al. |
| 9,262,688 B1 | 2/2016 | Zadehlotfia |
| 9,276,971 B1 | 3/2016 | Walker et al. |
| 9,432,622 B1 | 8/2016 | Winsor et al. |
| 10,176,366 B1* | 1/2019 | Maxwell ............... G06V 40/20 |
| 2002/0152077 A1 | 10/2002 | Patterson |
| 2004/0014017 A1 | 1/2004 | Lo |
| 2009/0012788 A1 | 1/2009 | Gilbert et al. |
| 2009/0174759 A1 | 7/2009 | Yeh et al. |
| 2010/0159891 A1 | 6/2010 | Sigmund et al. |
| 2011/0206189 A1 | 8/2011 | Kennedy et al. |
| 2011/0234384 A1 | 9/2011 | Agrawal |
| 2011/0301934 A1 | 12/2011 | Tardif |
| 2013/0010051 A1 | 1/2013 | Shlaimoun et al. |
| 2013/0204605 A1* | 8/2013 | Illgner-Fehns .......... G06F 40/40 704/2 |
| 2013/0212501 A1 | 8/2013 | Anderson et al. |
| 2014/0046661 A1 | 2/2014 | Bruner |
| 2014/0164703 A1 | 6/2014 | Kuesel et al. |
| 2015/0022616 A1 | 1/2015 | Talbot |
| 2015/0120293 A1* | 4/2015 | Wohlert ................. G10L 21/10 704/235 |
| 2016/0005336 A1 | 1/2016 | Peng et al. |
| 2016/0042228 A1 | 2/2016 | Opalka et al. |
| 2016/0170970 A1 | 6/2016 | Lindblom et al. |
| 2017/0032660 A1 | 2/2017 | El-Mankabady et al. |
| 2017/0277684 A1* | 9/2017 | Dharmarajan Mary ..................... G10L 13/00 |
| 2019/0171716 A1* | 6/2019 | Weber ..................... H04N 7/15 |
| 2021/0043110 A1* | 2/2021 | Jung ....................... G10L 15/24 |
| 2022/0188538 A1* | 6/2022 | Vieira Rocha .......... G06F 40/10 |
| 2022/0279874 A1* | 9/2022 | Bergman ................ G10L 15/26 |
| 2022/0327309 A1* | 10/2022 | Carlock ................. G06F 40/47 |

\* cited by examiner

| VIDEO | TRANSLATION |
|---|---|
| 000000001 | DOG |
| 000000002 | BIG DOG |
| 000000003 | SCARY DOG |
| 000000004 | TINY DOG |
| 000000005 | GOING TO THE STORE |
| 000000006 | GOING TO THE STORE AND I'M IN A HURRY |
| 000000007 | I'M SORRY |
| 000000008 | I'M REALLY SORRY |
| 000000009 | A |
| 000000010 | B |
| 000000011 | 1 |
| 000000012 | 2 |
| ... | ... |

FIG. 9

METHODS, SYSTEMS, AND MACHINE-READABLE MEDIA FOR TRANSLATING SIGN LANGUAGE CONTENT INTO WORD CONTENT AND VICE VERSA

TECHNICAL FIELD

The disclosure relates to a communication system that provides sign language translation for hearing-impaired and hearing-capable users. More specifically, the disclosure relates to communication systems incorporating translation engines that not only examine the sign language content of arm and hand motion, but corresponding visual cues to more effectively translate sign language content into word content and vice versa.

BACKGROUND

Sign language is, by definition, a visual language. Most sign language users have hearing impairments that require a visual language in order to communicate with each other. For sign language users to communicate with those who do not know sign language, the sign language must be translated into language that can be written, voiced, or in some other way conveyed to non-sign language user. In certain situations, this is accomplished by a video relay service. The video relay service includes an interpreter who is connected visually to the hearing-impaired user, typically through a video phone line, and who is also connected audibly to the hearing-capable user by a regular phone line. The interpreter sees the sign language motions of the hearing-impaired user and voices or texts what they see to the hearing-capable user. When the hearing-capable user responds, the interpreter at the video relay service signs the response to convert the spoken language into sign language that can be understood by the hearing-impaired user.

Some attempts have been made to automate this process in order to eliminate the need for an interpreter. These attempts use a machine in order to compare frames of video data containing sign language motion information to a library in an attempt to find a corresponding word that can be compiled into a sentence that can be voiced, written, or otherwise represented to a hearing-capable person. Several things make this limited approach problematic. First, there is not a one-to-one correlation between signs and words. A large number of signs can have multiple meanings, each represented by different words. Second, sign language is dynamic, involving certain predefined motions in certain predefined sequences. In contrast, the written word is static. Some sign language motion may vary from user to user, which might confuse make the translation difficult. Thirdly, there are far fewer signs than words. There are many more ways to describe or represent a thought with words than with signs. Accordingly, the sign language user often uses expression or the way they sign as a means to convey or represent a thought more descriptively or accurately.

Because automatic translators typically only look at single frames of specific arm or hand motions in order to translate sign language into written or voice language, or some other representation of language, they often miss the intended meaning of the signing done by the sign language user. Correct translation of a sign depends on first knowing the beginning and ending of the motion for a particular sign. Further, Correct translation of a sign often depends on much more than the actual sign indicated by hand and arm motion. Indeed, correct translation may depend on a variety of visual cues that may accompany the sign language motion.

Traditional communication systems, such as standard and cellular telephone systems, enable verbal communications between people at different locations. Communication systems for hearing-impaired individuals may also enable non-verbal communications instead of, or in addition to, verbal communications. Some communication systems for hearing-impaired people enable communications between communication devices for hearing-impaired people and communication systems for hearing-capable users (e.g., standard telephones, cellular telephones, etc.). For example, a video relay service (VRS) may provide speech to sign language translation services, and sign language to speech translation services for a communication session between a video phone for a hearing-impaired user and a traditional telephone for a hearing-capable user. With conventional VRS systems, the hearing-impaired user communicates with a human call assistant (e.g., communicating via sign language) over a first connection, and the human call assistant conveys the messages (e.g., communicating via voice) with the far-end user over a second connection. Typical VRS services provide call centers that employ sign language interpreters that provide the sign language interpretation for calls that involve a hearing-impaired user and a hearing-capable user. Communication systems, methods, and corresponding non-transitory machine-readable storage media that can provide improved automated translation services between sign language content and word content without the need of a human interpreter would be an advancement in the art.

BRIEF SUMMARY

In some embodiments, the communication system includes a single communication device for providing automatic translation of video stream containing sign language and any content indicators such as visual cues into word content and vice versa. The communication device may receive sign language content and/or word content, translate the content using a translation engine, and output a word content and/or sign language content translation to the same communication device. In this way, a communication device, such as a cell phone for example, can become a personal translator without the need for a human interpreter. The communication device may use a translation engine that compares captured video stream to video files containing sign language content and content indicators. Each such video file is associated with or correlates to word content that can be combined into a word content translation. The translation engine can also provide sign language content video translation from word content input into the system using the reverse steps.

In certain embodiments, the communication system may include multiple communication devices. Using similar translation methods, word content and/or sign language content may be input to a first communication device, translated by a translation engine, and output to a second device as a word content and/or sign language content translation.

In other embodiments, a video relay service may be used by, or be part of, the communication system to provide automatic translation services during a real-time communication session, the video relay service comprising at least one server or processor configured to receive a video stream containing sign language content from a first or near-end video communication device associated with a hearing-impaired user, automatically translate the sign language content into a verbal language or word content translation during the real-time communication session without assistance of a human sign language interpreter, and transmit the verbal language or word content translation to a second or far-end communication device associated with a hearing-capable user during the real-time communication session.

A method of providing automated translation is disclosed. The method may include receiving an input from a communication device. The input may be at least one of sign language content and word content. The method further includes translating the input into one of sign language content and word content using a translation engine. The translation engine is configured to compare at least one sign language content segment and any content indicator corresponding to a sign language content segment with at least one stored video file. The stored video file includes sign language content and content indicators that represent or correlated to word content. The word content is combined into a translation and output to a communication device. The method similarly includes receiving word content input and translating it into sign language content using the translation engine. The input word content may be compared to a stored word content file that correlates to a video file containing a sign language content segment that may also include content indicators. The video files may be combined into a translation and output to a communication device.

In another embodiment, a method of providing translation between two communication devices is provided with input and output steps similar to those described above. The method may also utilize ad video relay service to provide translation services during a real-time communication session. The method of this embodiment comprises establishing a communication session between a video communication device associated with a hearing-impaired user and a far-end communication device associated with a hearing-capable user through a translation engine, automatically generating, with the translation engine, a first translation of sign language content from a video stream from the video communication device without a human sign language interpreter performing the sign language translation for the communication session, and transmitting the first translation from the translation engine to the far-end communication device during the real-time communication session.

A video communication system is disclosed comprising a plurality of video communication devices configured for hearing-impaired users to engage in communication sessions with hearing-capable users and a video relay service. The video relay service is configured to establish communication sessions between video communication devices associated with hearing-impaired users and far-end communication device associated with hearing-capable users, automatically generate translations of sign language content from a video stream from the corresponding video communication device during real-time communication sessions without a human sign language interpreter performing the sign language translation for the communication session, transmit the translation from the translation engine to the corresponding far-end communication device, automatically generate with the translation engine, a second translation of voice content from an audio stream from the corresponding far-end communication device, and transmit the second translation from the translation engine to the video communication device during the real-time communication session.

In one embodiment, the translation engine is an artificial intelligence engine that is configured to receive video stream including the sign language video stream from the hearing-impaired user, analyze the video data to recognize phrases stored in a sign language database (e.g., American Sign Language), and translate the sign language content or data into the word content, including the spoken language of the hearing-capable user (e.g., English, Spanish, etc.). The artificial intelligence engine then communicates the translated data (e.g., voice and/or text) to the hearing-capable user during the call. The artificial intelligence engine is also configured to receive the audio stream including voice data from the hearing-capable user, analyze the voice data (e.g., using voice recognition software) to translate the voice data into a language supported by the system that is understood by the hearing-impaired user. In some embodiments, the artificial intelligence engine then communications the translated data (e.g., text and/or gestures) to the hearing-impaired user during the call. Thus, the use of human sign language interpreters may not be required for a call. As a result, a video relay service may be enhanced and streamlined over conventional methods. In addition, the number of sign language interpreters required by the video relay service may be significantly reduced.

BRIEF DESCRIPTION OF THE DRAWINGS

FIG. 9 is an example of a set of database entries stored in the AI servers or processors as data objects in the AI translation database.

DETAILED DESCRIPTION

Figure 1:
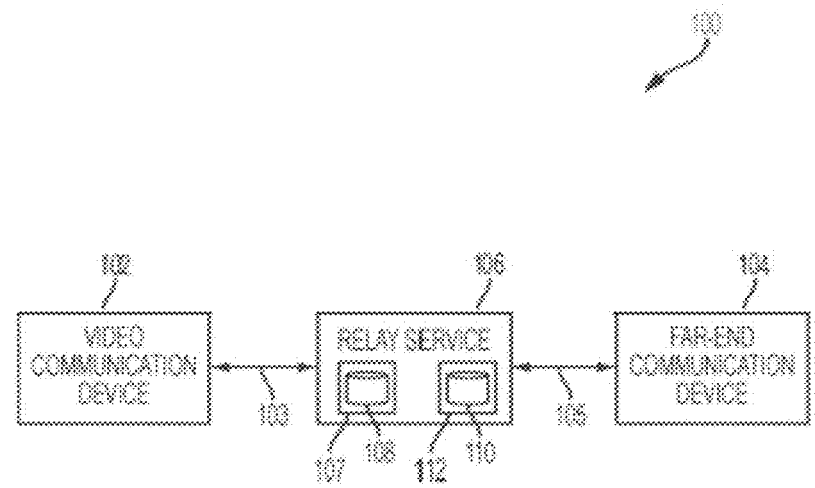
FIG. 1 is a simplified block diagram of a communication system according to an embodiment of the disclosure.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art. Furthermore, all or a portion of any embodiment disclosed herein may be utilized with all or a portion of any other embodiment, unless stated otherwise.

In accordance with common practice the various features illustrated in the drawings may not be drawn to scale. The illustrations presented herein are not meant to be actual views of any particular apparatus (e.g., device, system, etc.) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information, data, and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal. Additionally, the terms "data," "signal," "input," "output," and "stream" may be used interchangeably. For example, a "video stream" may be described as including video data transmitted by video signal. It is to be understood that a reference to a video stream is meant to include the video data contained therein and the video signal by which it is transmitted. References to video data are meant to include the stream it may be found in and the signal it may be transmitted by. Similarly, references to video signals are meant to include the video data they include and the video stream source from which they derive. The same is true for audio inputs or outputs that may contain audio data and be transmitted by an audio signal or as part of a video or other signal. These references should be considered to be used interchangeably. A reference to one of these terms is meant to include all of the corresponding terms. Furthermore, text and word content data, signals, and streams, however they may be input or output, may be used interchangeably in a similar fashion.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

"Processor" as used herein may be any processor, controller, microcontroller, or state machine suitable for carrying out processes of the disclosure. In particular, a processor may be configured to process real-time video images and objects with parallel processors with a GPU or image pipeline as the hardware support for the translation engines described below. Parallel processing of live video with object detection software may utilize multiple GPU-like processors to handle the live video. A processor may also be implemented as a combination of computing devices, such as a combination of a DSP and a microprocessor, a plurality of microprocessors, one or more microprocessors in conjunction with a DSP core, or any other such configuration.

The term "translation engine" means any combination of software, hardware, and/or firmware capable of performing the translation processes described herein. Some or all of a translation engine may reside in more than one location and may be in communication through means known in the art.

The terms "memory" and "memory device" may be used interchangeably to mean any device that can store, transmit, and/or receive data or information related to the embodiments described herein, or components, modules or units of the embodiments described herein. "Memory" as referenced herein, may be either volatile memory or nonvolatile memory, or may include both volatile and nonvolatile memory. By way of illustration, and not limitation, nonvolatile memory may include read only memory (ROM), programmable ROM (PROM), electrically programmable ROM (EPROM), electrically erasable PROM (EEPROM), or flash memory. Volatile memory can include random access memory (RAM), which acts as external cache memory. By way of further illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). References to "memory" are intended to comprise, without being limited to, these and any other suitable types of memory, and include computer storage media.

When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video relay service for providing sign language interpretation services to assist hearing-impaired users. Embodiments include features that improve the functionality of the video relay service such that a new video relay service and method for operating a video relay service without a human sign language interpreter is provided.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged.

A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "connect," "connecting," "connection," and other derivations of "connect" refer to communicating or establishing a communication session between two or more elements. These terms do not necessarily mean that there is a physical connection between the elements. The "connection" may be through an appropriate wireless communication network as well as a wired communication network. The two or more elements may reside in a single device, as in for example, a cell phone where in input may connect to one or more processors or on board translation engines. It should be understood that the phrase "connecting a user" (or variations thereof) is a shorthand way to describe connecting the device associated with the user with another device associated with another user. Similarly, it should be understood that phrases such as "transmitting data to a user," "receiving data from a user," "communicating with a user" are also shorthand for data communication between the communication devices associated with the respective users.

The expression "configured to" as used herein may be used interchangeably with "suitable for," "having the capacity to," "designed to," "adapted to," "made to," or "capable of" according to a context. The term "configured" does not necessarily mean "specifically designed to" in a hardware level. Instead, the expression "apparatus configured to . . . " may mean that the apparatus is "capable of . . . " along with other devices or parts in a certain context.

Embodiments of the disclosure include apparatuses and methods for operating a communication system. The communication system may be a single communication device or multiple communication devices. Similarly, a "communication session" may occur within a single communication device or between multiple communication devices. The communication system may also utilize or include a video relay system (VRS). In a typical VRS environment, a "first" or "near-end" communication device may be operated by a user having a hearing impairment, and a "second" or "far-end" communication device 104 may be operated by a hearing-capable user. The user of a video communication device may be referred to as "near-end user" or a "far-end user." Of course, it is recognized that "near-end" and "far-end" are relative terms depending on the perspective of the particular user. Most examples herein are described from the perspective of the hearing-impaired user. Thus, the terms "near-end" and "far-end" are to be understood as a convenient way of distinguishing between devices or users. It is also recognized that calls that involve the VRS system may originate from either the hearing-impaired user or the hearing-capable user.

Embodiments of the disclosure may also include a VRS system that incorporates a translation engine configured to provide sign language interpretation of a real-time (i.e., "live") communication session without a human sign language interpreter. The translation engine may be an artificial intelligence (AI) engine. The translation may also be an algorithm engine. The translation engine may also be a generative adversarial network. The translation engine may a learning machine. For ease of description, any or all of these translation engines may be referred to as an artificial intelligence engine, an AI engine, an AI translation engine, and/or simply a translation engine.

The phrase "sign language" or "sign language content" as used herein refers to the pre-defined hand and arm motions of a particular sign language. Beyond these defined hand and arm motions, a signer may add visual cues that may provide context beyond lingual context to the sign language content. These visual cues are referred to as "content indicators." By way of non-limiting example, a "content indicator" may include a head position, a head motion, a face position, a face motion, a body position, a body motion, an arm motion speed, a hand motion speed, an arm motion range, a hand motion range, a lip position or motion, a cheek position or motion, an eyebrow position or motion, an eye opening size or motion, a brow position or motion, a mouth position or motion and/or combinations of these. The term "content indicator" may include anything beyond the prescribed motions of sign language content that conveys an emotion. The term "content indicator" also includes any information captured by a series of video frames containing sign language content that may be helpful in determining what the sign language content means. These "content indicators" may include, without limitation, an image fragment, a motion vector, a foreground image segmentation, a background image segmentation, a special relationship between objects in a frame, and the like. In certain embodiments, these content indicators may have more to do with analysis of the captured images than of the sign language content captured by a camera.

The term "word content," is meant to include letters, numbers, symbols, words, phrases, sentences, parts of the foregoing, groups of the forgoing, and the like. "Word content" can include the spoken or verbal language of a hearing-capable user (e.g., English, Spanish, etc.). Word content is not limited to text and can be expressed as audio or video signals or data. For example, word content can be voice by a person or computer as audio or be part of a video representation.

Turning now to FIG. 1, a simplified block diagram of a communication system 100 according to an embodiment of the disclosure is shown. The communication system 100 may include a plurality of communication devices 102, 104, at least one of which is configured to capture video stream comprising sign language content. At least two of the plurality of communication devices are in operable communication with a translation engine 110. The plurality of communication devices 102, 104 may also be in operable communication with a communication network such that each of the plurality of communication devices may engage in communication session with another communication device.

In this configuration, the translation engine 110 may be used for automated translation between a hearing-impaired user having a first or near-end communication device 102 and a hearing-capable user having a second or far-end communication device 104. The first communication device 102 would capture the sign language content and content indicators provided by the signer as a video stream, which would be translated in real time into word content, which would be presented to as text, audio, and or video to the second communication device 104 and displayed to the hearing-capable user. The hearing-capable user could then input word content into their device 104 for translation into sign language content which would then be displayed as a video file to the hearing-impaired user.

In one embodiment, the communication system 100 includes or is associated with a video relay service 106. In this configuration, the translation engine 110 is configured to automatically generate translations of sign language content from a video stream from a corresponding video communication device 102 associated with a hearing-impaired user during real-time communication sessions without a human sign language interpreter performing sign language translation for the communication. The translation engine 110 would also be configured to automatically generate translations of word content from a test, audio, and/or video input corresponding to a communication device associated with a hearing-capable user during real-time communication sessions without a human sign language interpreter performing sign language translation for the communication session.

In this embodiment, the video relay service 106 may establish a communication session between two or more communication devices. The communication session may include two separate connections; one 103 between the first communication device 102 and the relay service 106 and one 105 between the second communication device 104 and the relay service 106. Receiving an input from a communication device 102, 104 may include the step of the video relay service 106 receiving an input from a first communication device 102. Outputting one of sign language content and word content to a communication device 102 may include the video relay service 106 outputting one of sign language content and word content to a second communication device 104. Outputting one of sign language content and word content to a communication device 102, 104 may include outputting sign language content in a simulated avatar format depicting the sign language content.

In this embodiment, the first 102 and second 104 may be specifically configured to participate in communication sessions via a video relay service 106 through one or more networks. Thus, the first communication device 102 may be a video communication device 102. During a live communication session, the video communication device 102 is connected to the video relay service 106 over the first connection 103, and the video relay service 106 is connected to the far-end communication device 104 over the second connection 105. The video communication device 102 may comprise a communication device specifically configured for use by a hearing-impaired user. Communication devices that may be used to assist users having such an impairment may include a video phone device, a text-captioned device, a keyboard, a remote control, other devices or accessibility interfaces, and combinations thereof. The video communication device 102 may include a computing device configured to execute software directed to perform such communication capabilities. In such an embodiment, the computing device may be modified with software to operate as a video communication device. Examples of suitable computing devices may include a desktop computer, a laptop computer, a tablet computer, a personal digital assistant (PDA), a smartphone, a set top box coupled with a monitor (e.g., television) and camera (e.g., webcam), and other computing devices. Communication devices may also be referred to as "endpoints."

It should be understood that the video communication device 102, the far-end communication device 104, and the relay service 106 may be configured to transmit the data signals 103, 105 over one or more networks. The networks used for conveying the data signals 103, 105 may include an internet protocol (IP) network. The networks may also include other networks, such as, for example, public switched telephone networks (PSTNs). The networks may include a wide area network (WAN), a local area network (LAN), a personal area network (PAN), and wireless cell networks such as FDMA, TDMA, CDMA, OFDMA, etc. and combinations thereof. In some embodiments, the networks may include a cloud network. The networks may be configured to facilitate wireless communications, communications through cables, and combinations thereof. Some non-limiting examples of suitable wireless communications may include "Wi-Fi" and mobile wireless networks. Some non-limiting examples of suitable cables include fiber-optic cables, coaxial cables, traditional telephone cables, and Ethernet cables.

Video data (e.g., streaming image data captured by a camera) may be transmitted from the video communication device 102 to the video relay service 106 over the first connection 103. The video data may include content such as the sign language gestures (sign language content) made by the near-impaired user. If the near-end user has at least some speech capabilities (e.g., users that are hearing-impaired, but have some ability to speak), voice data may be transmitted from the video communication device 102 to the video relay service 106 over the first connection 103. Video data and/or text data may be transmitted from the video relay service 106 to the video communication device 102. The text data may include content such as the translated text for the content generated by the far-end user as translated by the video relay service 106. For embodiments that include video data from the video relay service 106, such video may include content such as an avatar making sign language gestures of content generated by the far-end user as translated by the video relay service 106. If the near-end user has at least some audible-capabilities (e.g., users that are not completely deaf), voice data may be transmitted in addition to the video data from the relay service 106 to the video communication device 102. In some embodiments, however, audio from the video communication device 102 may be disabled such that the video relay service 106 and/or the far-end communication device 104 may not be able to hear any speech or other audible noise from the video communication device 102.

Word content in the form audio inputs such as voice data (e.g., streaming audio data captured by a microphone) may be transmitted from the far-end communication device 104 to the video relay service 106 over the second connection 105. The voice data may include content such as the spoken language made by the near-impaired user. Voice data generated by the far-end user is not limited to live voice from a live person. For example, the far-end user may include an automated telephone menu system that transmits voice data that includes synthesized voice, recorded voice, or other audible information intended to convey information (e.g., interactive voice response (IVR)). Voice data and/or text data may be transmitted from the video relay service 106 to the far-end communication device 104 over the second connection 104. This voice data may include content such as the translated synthesized voice translated from the sign-language content generated by the hearing-impaired user as translated by the video relay service 106.

The video relay service 106 is configured to interpret communication between the video communication device 102 and the far-end communication device 104 to facilitate assisted communication sessions therebetween. The relay service 106 may include a profile server 107 including a customer database 108 and other databases storing information from which the relay service 106 may query to authenticate registered users, establish communication sessions, route communication sessions, etc. For example, the customer database 108 may include customer records including the name, address (e.g., street address, city, state, zip code, etc.), and other information for establishing the user as a valid customer of the relay service 106 for participating in assisted calls.

As discussed above, the video relay service 106 may include or be connected to the translation engine 110 in any number of ways. Furthermore, the translation engine 110 may be an AI translation engine 110. The AI translation engine 110 may also include one or more AI servers or processors 112 configured to manage translation databases and specific parallel processor hardware used in the translation process of sign language to voice, sign language to text, voice to text, voice to simulated sign language, and combinations thereof during a real-time communication session between a hearing-impaired user and a hearing-capable user. As a result, the need for a human translator serving as an intermediary during a call may be eliminated. In certain embodiments, the translation engine 110 may also be an algorithm engine. The translation engine 110 may also be a generative adversarial network. The translation engine 110 may utilize learning machine techniques accurately and efficiently recognize sign language content and/or content indicators in a video stream and correlate such content with word content.

The AI servers 112 may be cloud-based servers hosting the AI translation database in a manner that is accessible to the video relay service 106 in order to simultaneously perform translation services for multiple calls at a given time for different hearing-impaired users of the communication system 100. In order to achieve real-time translation, the image or voice input may be split across many parallel processors and many parallel databases to effectively use the AI hardware. In some embodiment, the voice and/or signer may pause briefly (e.g., few milliseconds) between words and/or phrases to allow the parallel processors to determining a match in the respective language database. The word or phrase may extend over many frames of video and need to be analyzed in real-time by the AI engines, which may also be the case for the voice input into the AIengines. It will be appreciated that as used herein throughout, the term "server" may include the plural "servers" and the terms "server" and "servers" may be interchangeable with "processor" and "processors." Furthermore, these terms are not limited to a single location. Indeed, parallel processors are often used with AI systems and need not be located in the same location.

In another embodiment, a communication system, includes a communication device configured to capture at least one of capture a video stream, display a video stream, receive a text input (user keyboard), display a text output on a display, receive an audio input (voice), and play an audio output (synthesized voice). The communication device may be a video phone that may be include a camera for capturing at least a video stream. The terms "video stream," "video data," and "video signal," may be used interchangeably herein throughout. The communication device may include a display for displaying a video stream or a text output. The communication device may have a microphone for receiving an audio input, such as, in one example, the voice of a user. The communication device may also have speakers playing an audio output. The communication device may be in the form of a cell phone, a computer in operable communication with an integral or separate camera unit, a television screen in operable communication with a phone or camera system, or a combination of these or other devices that allow communication with a single phone or between two or more phones.

It will be appreciated by those of skill in the art that the communication system 100 may be just one communication device 102, such as the user's phone for example, and may not include or be connected to a relay service 106 or second phone 104 at all. Like in other embodiments described herein, the communication device 102 may be configured to capture a video stream and display one or more of video stream, a text output, and an audio output. A user may capture a video stream of a person performing, or video output device playing, sign language content. The user may record the sign language content on their communication device 102. The communication device 102 is in operable communication with a translation engine, which in this embodiment lies outside of the relay system 106 and is not shown. The sign language content and any content indicators in the captured video stream may be translated by the translation engine into word content and displayed as text, synthesized audio, or in other ways on the same communication device that captured the video stream. In this way, the communication system 100 acts as a personal translation device, allowing the user to video a signer or sign language appearing on video display and have it translated into word content for presentation as one or more of text, audio, and video on the user's communication device 102. Accordingly, a hearing-capable user may understand conversations happening in a room full of hearing-impaired users communicating only through sign language.

In another embodiment, the communication device may be configured to display a video stream and do one or more of receive a text input, receive an audio input, and capture a video stream. In this configuration, a user may input word content into the communication device, which may be translated by the operably connected translation engine into sign language content and displayed as a video stream on the communication device. The user may provide word content input to the communication device as text, audio by speaking the word content, or as part of a video input. In this way, the communication system again acts as a personal translation device. In this configuration, however, the user inputs word content which can be translated and shown to a hearing-impaired user as a video stream on the user's communication device. Thus, the user can communicate to others in a room full of hearing-impaired users who may only be able to communicate through sign language.

The translation engine for a multiple phone communication system (see FIG. 1) or a single phone communication system (see FIG. 1A) may be located on a single communication device and be executable using one or more of the communication device's processors. In one embodiment, the processors are cell phone processors. A translation engine may also be accessible by the communication device over the internet, a cloud based network or some other network or connection. It will be appreciated that the communication device may access the translation engine in any number of ways known in the art. The translation engine may include or reside on one or more processors, including parallel processors that may exist in one or multiple locations.

Speaking of both single and multiple device communication systems 100, 100a. The translation engine may be configured for generating one or more of a translation of sign language content contained in a video stream into word content, and a translation of word content contained in one or more of text, an audio input, and a video stream into sign language content. In other words, the translation engine may provide translation in a multiple device communication system 100 in both directions between a hearing-impaired user and a hearing-capable user. It may also be able to provide single phone translation on a single phone for both a hearing-impaired user and a hearing-capable user.

In embodiments where the translation if from sign language content to word content in either a single phone or multiple phone system, the translation engine is configured to identify at least one sign language content segment in a video stream. A sign language content segment may include chunks of data or video frames that contain the arm and/or hand motions for a particular letter, word, or phrase in sign language. The sign language content segments may be determined by observing or identifying pauses that typically occur between arm and/or hand motions when a signer signs a particular letter, word, or phrase in sign language. The pauses may be small in some cases. In one embodiment, the translation engine may be trained to identify pauses by observing signers signing over an extended period of time.

The translation engine may also be configured to identify at least one content indicator corresponding to the sign language content segment. In one embodiment, translation of sign language content may depend upon recognizing more than just the hand and/or arm motion comprising the sign language content. Content indicators include visual cues provided by the motion, expression, and body language of the signer that are in addition to the minimum hand and arm movement required to convey particular sign language content. These content indicators provide a better translation of sign language content into word content. Certain content indicators also provide punctuation for a language that otherwise has none.

When a signer performs the arm and hand motions representing sign language content, they may do it with a smile, or scowl, or speed of motion, or other visual que that helps provide meaning to the sign language content. In one embodiment, a content indicator comprises one or more of a head position, a head motion, a face position, a face motion, a body position, a body motion, an arm motion speed, a hand motion speed, an arm motion range, and a hand motion range. A content indicator may include one or more of a lip position or motion, a cheek position, an eyebrow position, an eye opening size, a brow position or motion, a mouth position or motion and the like. Content indicators such as facial expressions and body language convey an emotion, feeling, or mood of the signer such as, by way of nonlimiting example, love, happiness, sadness, fear, anger, disgust, surprise, acceptance, anticipation, shock, disappointment, disbelief, energy, melancholy, and eagerness to name just a few. These emotions, feelings, or moods provide context beyond the lingual context of a particular sentence, that help provide a more accurate translation for the sign language content provided by the signer displaying such content indicators while signing the sign language content.

In one embodiment, the translation engine identifies whether the signer is happy or shocked for example, by examining lip position and brow shape. The upturned lips or furrowed brow, when combined with the sign language content may help distinguish between two very similar sign language motions that have two different meanings; one have a positive connotation and one have a negative connotation. The translation engine may also distinguish between video files containing prerecorded sign language content having similar hand and/or arm motions, with different facial expressions or body language. The slightly different content indicators in the stored video files may provide a more nuanced, and consequently a better, translation of the sign language content captured in the video stream.

For example, happiness may be indicated with facial positions or movement indicating smiling or laughing, which may be accompanied by a relaxed or demure body stance. In contrast, sadness may be expressed by a downward glance and tight lips. Determining a mood by analyzing content indicators can rule out certain translations of the accompanying sign language content that don't match up with the particular mood indicated by the content indicator. Content indicators such as the wrinkling of a nose to show disgust, the constriction of the face to indicate cold, the widening mouth and eyes to show shock or surprise, or the shrugging of shoulders to express confusion, help narrow in the intended meaning of the sign language content provided by the signer, especially in instances where the same sign language content can have slightly or vastly different meanings.

The speed of the sign language motion and the range of the motion also serve as content indicators. Sign language content performed with faster or more expansive motion can indicate an intense or eager motion that is consistent with the word content translation of the accompanying sign language content and inconsistent with others. Conversely, when signing sing language content about something scary or fragile, the sign language motion slows down and occupies a smaller space or range. These content indicators express the fear, for example, of the signer. These content indicators may rule out translations of the sign language content associated with calmness or a relaxed state.

The content indicators also allow for the expression of varying degrees of something using the same sign. For example, the sing for small is indicated by bringing the palms of both hands toward each other. However, if the shoulders are rolled forward and the area or space typically used to sign the word small is decreased, the signee may use the motion representing "small," but may actually mean "very small" or "even smaller." Additionally, the sign language content representing "rain" is made by using the hands slightly above the shoulders, palms facing out, fingers extended and pivoting the hands downward at the wrist. However, if this sign language content is expressed more animatedly, with a certain abruptness to the motion, the user or signer is more than likely intending to express a lot of rain or a downpour. A smaller, slower motion for this sign probably means less than your typical rain and more of a sprinkle.

The translation engine may be configured to compare at least one sign language content segment and any content indicator corresponding to a sign language content segment with at least one stored video file comprising at least sign language content. The video file represents certain word content. Accordingly, if, after a comparative analysis between the sign language content with any associated content indicator and the video files, a sufficient match is found, the word content corresponding to the particular video file may be used as a translation of the sign language content and associated content indicator captured in the video stream. Content indicators such as these, coupled with the particular arm and hand motion of the sign language content may provide a more accurate translation found in the video stream and compared to sign language content and appropriate content indicators found in the video file.

Using the sign language content for "rain" as an illustrated example, the translation engine could distinguish between the words, sprinkle, rain, downpour, drizzle, and other similarly nuanced signs for rain. The system of the present invention may include a translation engine which utilizes stored video files of a signer performing the sign language content for rain with a variety of different content indicators. Accordingly, when the translation engine compares the sign language content for rain in a captured video stream, together with any content indicator associated with the sign language content in a sign language content segment, the translation engine can conduct comparative analysis to come up with a more nuanced or descriptive word content translation than simply, "rain". In one embodiment, the face and torso recognition techniques discussed herein may be utilized to capture content indicators in addition to sign language content. The translation engine is configured to combine derived word content into a word translation representing sign language content for output on the communication device.

In embodiments, where a single device or multiple device communication system is used to convert word content into sign language content, a text to sign language translation may be accomplished by the translation engine. The translation engine may be configured to generate a translation of word content contained in one or more of a text input, an audio input, and a video stream into sign language content. The translation engine may identify word content from one or more of the text input, the audio input, and the video stream. The word content may include one or more of a word, a letter, a number, a symbol, a phrase, a sentence fragment, and a sentence. The translation engine may compare the word content to stored video files containing sing language content. In certain embodiments, the translation engine may compare the word content to stored video files containing sing language content and one or more content indicators. The translation engine may combine the chosen stored video files in a sign language content translation representing word content for output on one or more communication devices. In one embodiment, the communication system or translation engine may present the sign language content translation as coming from a single signing avatar or person. This may help with the continuity of the presentation.

Figure 2:
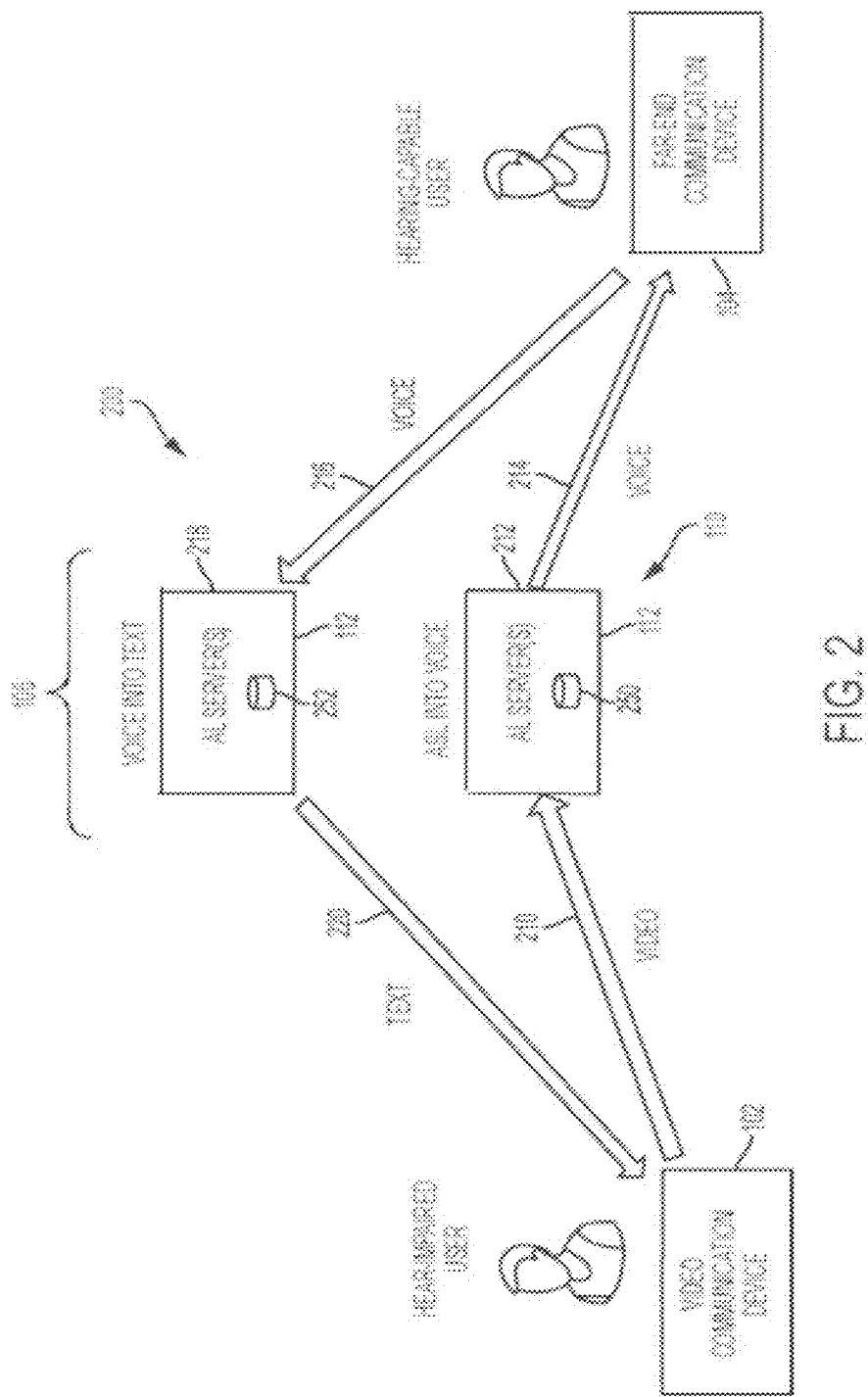
FIGS. 2 through 5 are simplified block diagrams of communication systems having multiple communication devices, showing various data flows according to embodiments of the disclosure.

FIG. 2 is a simplified block diagram of a communication system 200 showing the data flow according to an embodiment of the disclosure. The communication 200 includes the video communication device 102, the far-end communication device 104, and the video relay service 106.

The video relay service 106 includes an AI translation engine 110 including AI servers 112 as discussed above. The AI servers 110 may include translation databases 250 stored thereon for its processors to query, update, etc. to perform the translation operations during the real-time communication session.

In operation, the hearing-impaired user signs to the camera of the video communication device 102, which transmits the video data with a video stream to the video relay service 106 at operation 210. At operation 212, the AI translation engine 110 of the video relay service 106 receives and analyzes the video stream (e.g., frame by frame, breaking down each image into sub-images for comparison against the database for recognition), and recognizes the sign language (e.g., ASL words or phrases) according to the video files for various phrases stored in an AI translation database 250. Examples of various AI translation systems may include an alphabet pattern recognition algorithm to recognize the spelling of a word on a letter-by-letter basis. Other systems may include convolutional neural networks (CNNs) or deep neural networks (DNNs) to map the raw pixels of the image data to corresponding phrase database. Such processing may be performed by parallel graphics processing units (GPUs) to achieve tremendously accelerated learning and inference ability at a speed (e.g., 30 fps or more) needed to support a real-time communication session. As a result, the sign language is translated into the language understood by the hearing-capable user (e.g., English, Spanish, etc.). The AI translation engine 110 may also generate synthesized voice of the translation that is transmitted as voice data to the far-end communication device 104 at operation 214. The synthesized voice may be reproduced by the speaker of the far-end communication device 104. In an alternative embodiment, the video relay service 106 may transmit the translation to the far-end communication device 104 as text data. As a result, the far-end communication device 104 may be configured to generate the synthesized voice locally responsive to the text data received from the video relay service 106.

At operation 216, the hearing-capable user speaks into the microphone of the far-end communication device 104, which transmits the voice data with an audio stream to the video relay service 106. At operation 218, the AI translation engine 110 of the video relay service 106 receives and analyzes the audio stream, and recognizes the spoken language (e.g., English, Spanish, etc.) according to various voice recognition systems. This translation may occur using various voice recognition services that translate voice data into text data as known in the art or other speech-to-text systems that use phonetic sound libraries 252 and grammar rules to recognize words and phrases using contextual information or that are configured to read text outload. As a result, the spoken language is translated into a textual based language understood by the hearing-capable user (e.g., text of English, Spanish, etc.). The AI translation engine 110 may transmit the translation as text data to the far-end communication device 104 at operation 220. The translated text is then displayed on the electronic display of the video communication device 102. In some embodiments, the spoken language of the hearing-capable user may be the same as the textual language of the hearing-capable user (e.g., English/English, Spanish/Spanish, etc.). In some embodiments, the spoken language of the hearing-capable user may be different than the textual language of the hearing-capable user (e.g., English/Spanish, Spanish/English, etc.). As a result, the AI translation engine 110 may be configured to perform multiple levels of translation, such as from Spanish voice into English text. In some embodiments, the voice to text translation may be performed by a captioning service such as described in U.S. Pat. No. 9,336,689, issued May 10, 2016, entitled "Methods and Apparatuses Related to Text Caption Error Correction," the disclosure of which is incorporated herein in its entirety by this reference.

Figure 3:
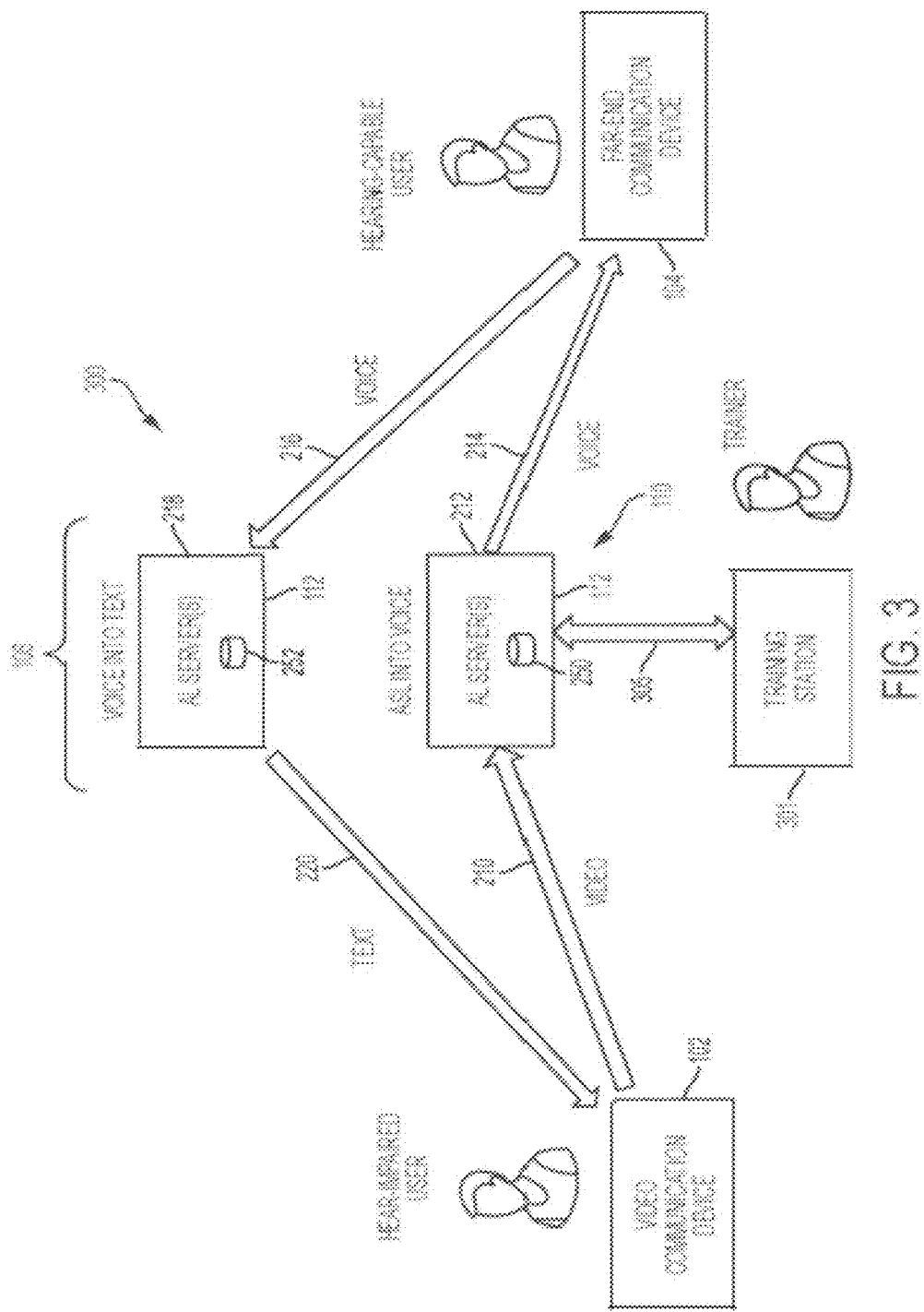

FIG. 3 is a simplified block diagram of a communication system 300 showing the data flow according to an embodiment of the disclosure. The communication 300 includes the video communication device 102, the far-end communication device 104, and the video relay service 106. The video relay service 106 includes an AI translation engine 110 including AI servers 112 as discussed above. The AI servers 110 may include translation databases 250 stored thereon for its processors to query, update, etc. to perform the translation operations during the real-time communication session. The communication system 300 may include a training station 301 within the video relay service 106 to improve the accuracy of the translation services. The training station 301 may be operated by a human operator or AI Training Engine (referred to as a "trainer") who understands sign language. The training station 301 may be configured to update the databases of the AI engine 110.

The data flow of FIG. 3 may be similar to the data flow of FIG. 2, but with the addition of communication occurring with the training station 301 at operation 305. In some embodiments, the trainer may monitor at least some of the communication sessions being facilitated by the video relay service 106. Thus, the training station 301 may be configured to receive the video data that includes the sign language content as well as the translated output (as synthesized audio and/or text) to review the accuracy of the automatic translation. If errors are identified, the trainer may enter the corrections into the training station 301, which then transmits the corrections to the AI servers 112 for updating the AI translation database 250 to be used in future calls facilitated by the video relay service 106. Voice to text translation and training each of the AI databases may also be improved similarly.

In some embodiments, this review process may occur after the call has ended with the trainer reviewing stored video and a corresponding transcript of the translation from the call. In some embodiments, a random sampling of calls (or portions of calls) may be saved in such a manner to provide for a repository of source material for the trainers to review and update the AI translation database 250 to improve accuracy that occurred in the translation. Thus, not every call may have its video and transcript stored by the system for review by the trainer. The video files with the sign language and the translated output files may be stored in the AI servers 250 or other external servers of the video relay service for the training station 301 to access when performing the review process. The translated output files may be saved as a text file with a textual transcript and/or an audio file with the synthesized audio translation for the trainer to review. In some embodiments, the files may be synchronized such that playback of the video and corresponding translation may be reviewed together. For example, the textual transcript may be time stamped such that viewing the sign language and the written text may be viewed through the user interface to be displayed together. In other embodiments, the textual transcript may be displayed in its entirety for the trainer to review as a whole with the sign language.

In some embodiments, the review process may occur during the call such that the training station receives real-time video and the corresponding transcript of the translation during a live call for the trainer to review. In some embodiments, a random sampling of calls (or portions of calls) may be connected to the training station 301 in such a manner to provide for the trainers to review and update the AI translation database 250 to correct for errors that occurred in the translation. For embodiments that include real-time monitoring during the call, in some embodiments the trainer may notify one or more of the parties of the incorrect translation. For example, the training station 301 may transmit a notification to the video communication device 102 for display to the hearing-impaired user to clarify a sign if it was unclear what the sign was. As a result, the hearing-impaired user may more clearly or slowly perform the sign or otherwise clarify what was said in the portion of the translation that was deemed incorrect. The AI translation engine 110 may then translate the new sign language content to update the AI translation database and/or transmit the corrected voice of the translation to the far-end communication device 104. In some embodiments, the training station 301 may transmit a notification to the far-end communication device 104 (e.g., by voice and/or text) to inform the hearing-capable user of an incorrect translation. If the trainer was able to determine the appropriate correction on her own, the trainer may simply utilize the training device 301 to make the correction to the AI translation database 250 and/or transmit the notification to the far-end device 104 without interrupting the hearing-impaired user. As a result, utilizing the training station 301 may improve the service quality by enabling a human sign language interpreter to monitor sign language to voice translation accuracy and improve the AI vocabulary by defining rare words/phrases or to account for different styles of signing that previously were not accounted for by the AI translation engine 110.

In some embodiments, the trainer may also perform a review of the voice to text translation and update the phonetic sound libraries 252 or grammar rules and/or notify the parties in a similar manner. Thus, utilizing the training station 301 may improve the service quality by enabling a human or AI trainer to monitor voice to text translation accuracy and improve the AI vocabulary by defining rare words/phrases or to account for different dialects that previously were not accounted for by the AI translation engine 110.

Figure 4:
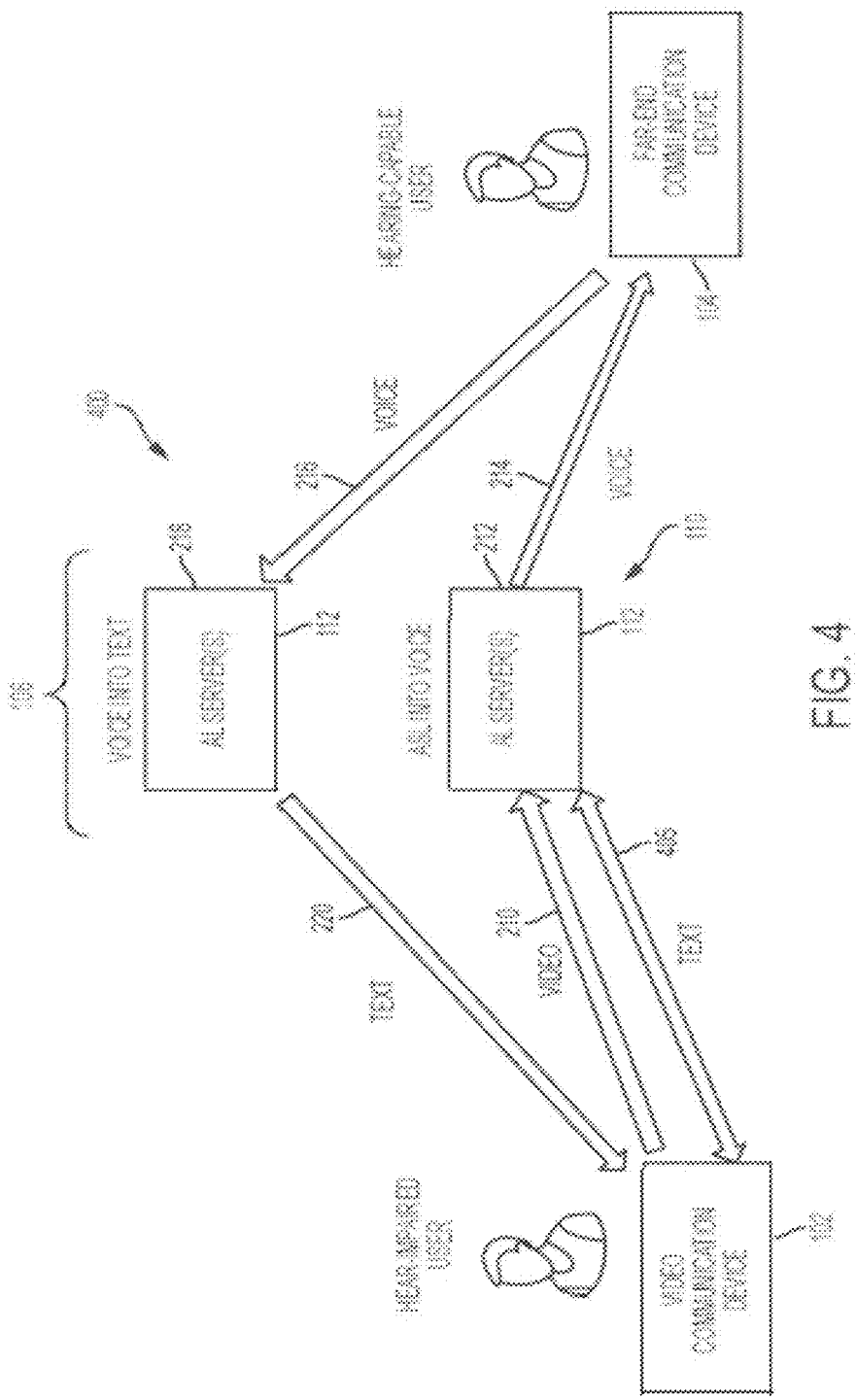

FIG. 4 is a simplified block diagram of a communication system 400 showing the data flow according to an embodiment of the disclosure. The communication 400 includes the video communication device 102, the far-end communication device 104, and the video relay service 106. The video relay service 106 includes an AI translation engine 110 including AI servers 112 as discussed above. The AI servers 110 may include translation databases 250 stored thereon for its processors to query, update, etc. to perform the translation operations during the real-time communication session.

The data flow of FIG. 4 may be similar to the data flow of FIGS. 2 and 3, but with the addition of text of the translation of the sign language content being transmitted back to the video communication device 102 at operation 405. During the call, a text translation of the sign language content of the near-end video may be transmitted from the video relay service 106 to the video communication device 102 for display by the video communication device 102. As a result, the hearing-impaired user may be able to monitor the translation to ensure that in real-time to determine whether the translation accurately reflects what was signed. If there is an error or misunderstanding, the hearing-impaired user may clarify the error by re-signing the phrase for correction and/or providing additional explanation to achieve a proper understanding. During this time, the AI translation engine 110 may continue to translate sign language content from incoming video data from the video communication device 102 into voice data for the far-end communication device 104. In some embodiments, the interface for the video communication device 102 may be configured to edit the translated text being displayed. Thus, the hearing-impaired user may utilize an input device (e.g., keyboard, mouse, remote control, etc.) to manually make corrections in the translated text. The corrected text may then be transmitted back to the relay service 106 and forwarded on to the far-end communication device 104 in a message with the clarified text. In some embodiments, the corrected text or other message input by the hearing-impaired user may be converted into synthesized audio for reproduction by the far-end communication device 104.

In some embodiments, the hearing-impaired user may perform tasks discussed above with respect to the trainer. For example, the hearing-impaired user may review the text of the translated output for the call to identify errors in the translation. As discussed above, this review may occur during a live call in order to enable the hearing-impaired user to provide real-time correction or clarification to the hearing-capable user for a mistranslation. In some embodiments, the review of the translation by the hearing-impaired user may occur after completion of the call. For example, the user interface presented by the video communication device 102 may enable the hearing-impaired user to enter into a training mode to review video and corresponding translations. In such embodiments, the corrections and/or other feedback provided by the hearing-impaired user may also be used by the AI translation engine 110 to update the AI translation database 250. The hearing-impaired user may have editing capabilities to define starting frames and ending frames for certain phrases and then an input field to enter the corresponding translation. Such changes may be made from stored video from an actual call. In some embodiments, the hearing-impaired user may prefer to record new video from which new phrases and/or update phrases can be defined and transmitted to the video relay service 106 to update the AI translation database 250. Over time as the AI translation database 250 grows in size the accuracy will increase.

In some embodiments, transmitted updates for the AI translation database 250 made by the hearing-impaired user may be reviewed first by a trainer for approval before updating the AI translation database 250. Thus, the AI servers 212 of the video relay service 106 may receive and store video files and their corresponding translations generated by hearing-impaired users of the communication system 400. If approved, the video files (perhaps with some modifications) may be added to the AI translation database 212 for future calls made by hearing-impaired users of the communication system 400.

In some embodiments, suggested updates made by individual hearing-impaired users may be stored in a user-specific AI translation database. The user-specific AI translation database may only be used by the AI translation engine 110 during calls involving the specific hearing-impaired user rather than by all hearing-impaired users of the communication system 400. For example, during the approval process the reviewer may determine that the signing used for a particular phrase is unique to the specific user rather than a global method of signing the phrase. As a result, the AI translation engine may manage a global database for the AI translation database 250 as well as a plurality of user-specific AI translation databases for each hearing-impaired user of the communication system 400. Thus, during a call, the AI translation engine 110 may utilize both the global AI translation database 250 as well as an individual user-specific database when performing the sign language translation.

Figure 5:
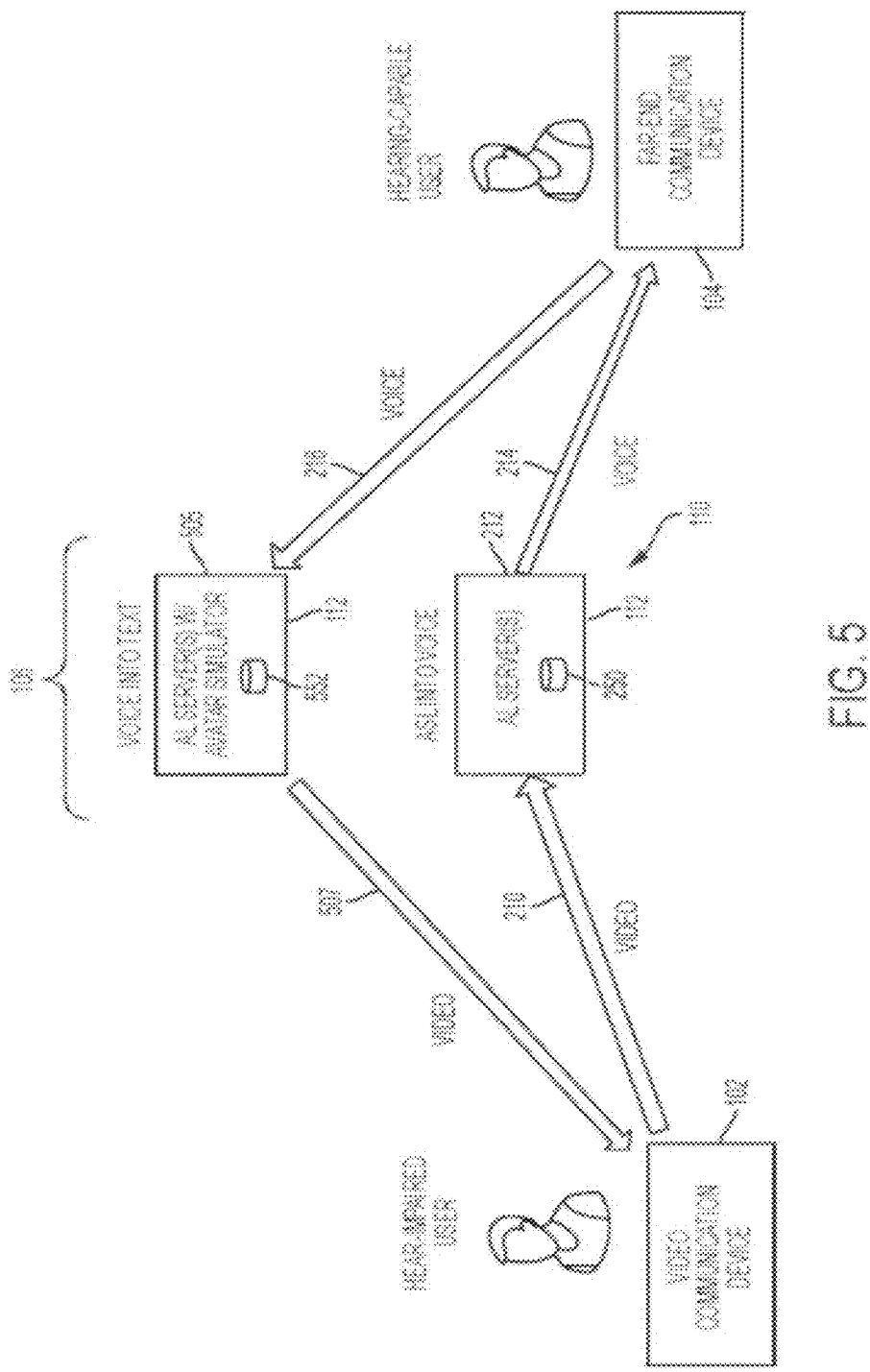

FIG. 5 is a simplified block diagram of a communication system 500 showing the data flow according to an embodiment of the disclosure. The communication 500 includes the video communication device 102, the far-end communication device 104, and the video relay service 106. The video relay service 106 includes an AI translation engine 110 including AI servers 112 as discussed above. The AI servers 110 may include translation databases 250 stored thereon for its processors to query, update, etc. to perform the translation operations during the real-time communication session.

The data flow of FIG. 5 may be similar to the data flow of FIGS. 2-4, but with the addition of an avatar simulator with the AI servers 112 used in the translation of the voice of the hearing-capable user at operation 505. The avatar simulator may be configured to generate video data for an avatar that performs simulated sign language when displayed by the video communication device 102. The AI translation servers 112 may also manage an avatar database 552 having phrases for different avatar signs stored therein. The avatar translation may be transmitted to the video communication device 102 as video data at operation 507, from which the video communication device 102 may display the avatar performing the signs of the translation. In some embodiments, the avatar database 552 may be populated with analyzing the video data from the AI translation database 250 and converting the sign language motions from each video file of the AI translation database into an avatar equivalent file. As a result, each avatar equivalent file may be linked to a phrase corresponding to the sign language motion of the file. In some embodiments, avatar files may be generated using motion sensors worn by human signers to capture the motions for various signed phrases to generate the corresponding avatar files to build the avatar database 552. As the AI translation database 250 grows, it may be linked to the avatar database 552 to have each expand together.

Adding to and/or correcting the avatar database 552 may be performed by trainers who review voice to avatar translations to identify and correct errors made by the AI translation engine 110. In addition, a text caption of the far-end voice may be sent to the video communication device 102 for display thereon in order for the hearing-impaired user to compare to the signs performed by the avatar during the call. In such embodiments, errors in the avatar translation may be identified by the hearing-impaired user who may notify the video relay service 106 of the error such that the avatar database 552 may be updated for future calls to the system 500.

Figure 6:
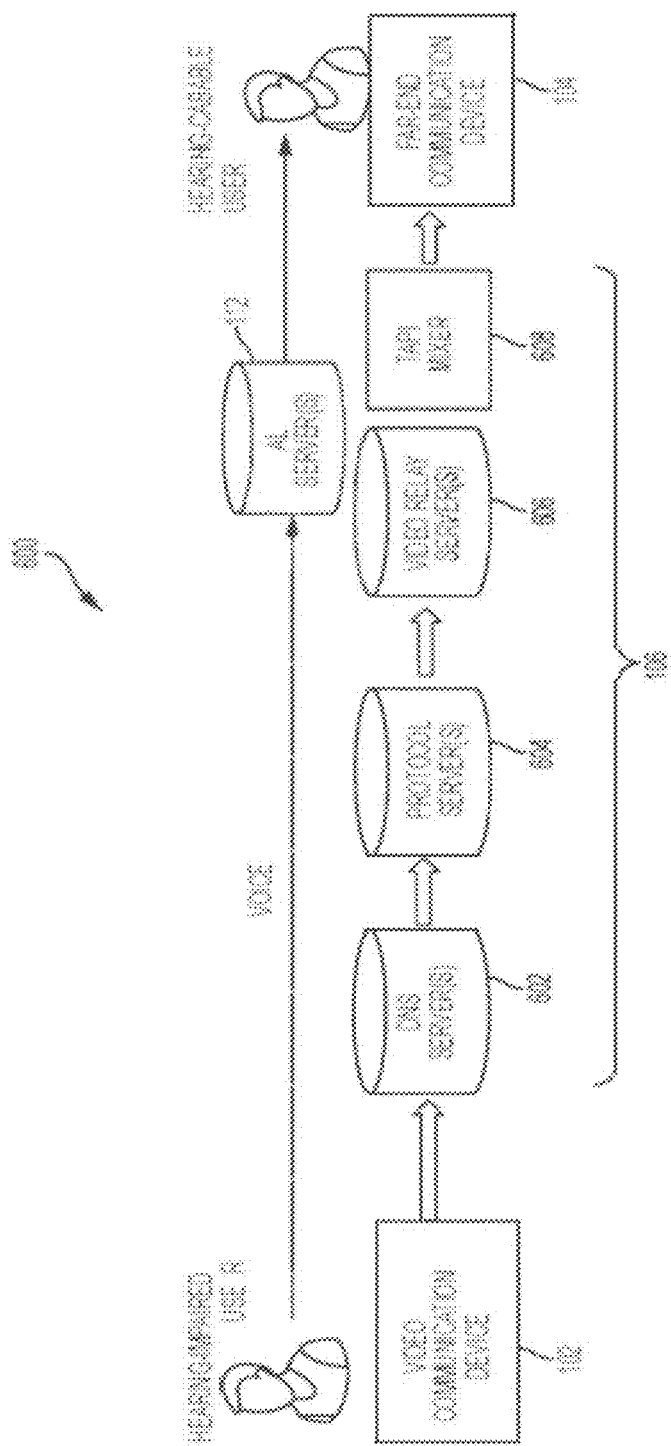
FIGS. 6 and 7 are simplified block diagrams of a call flow illustrating additional components of the backend system for the video relay service according to an embodiment of the disclosure.
Figure 7:
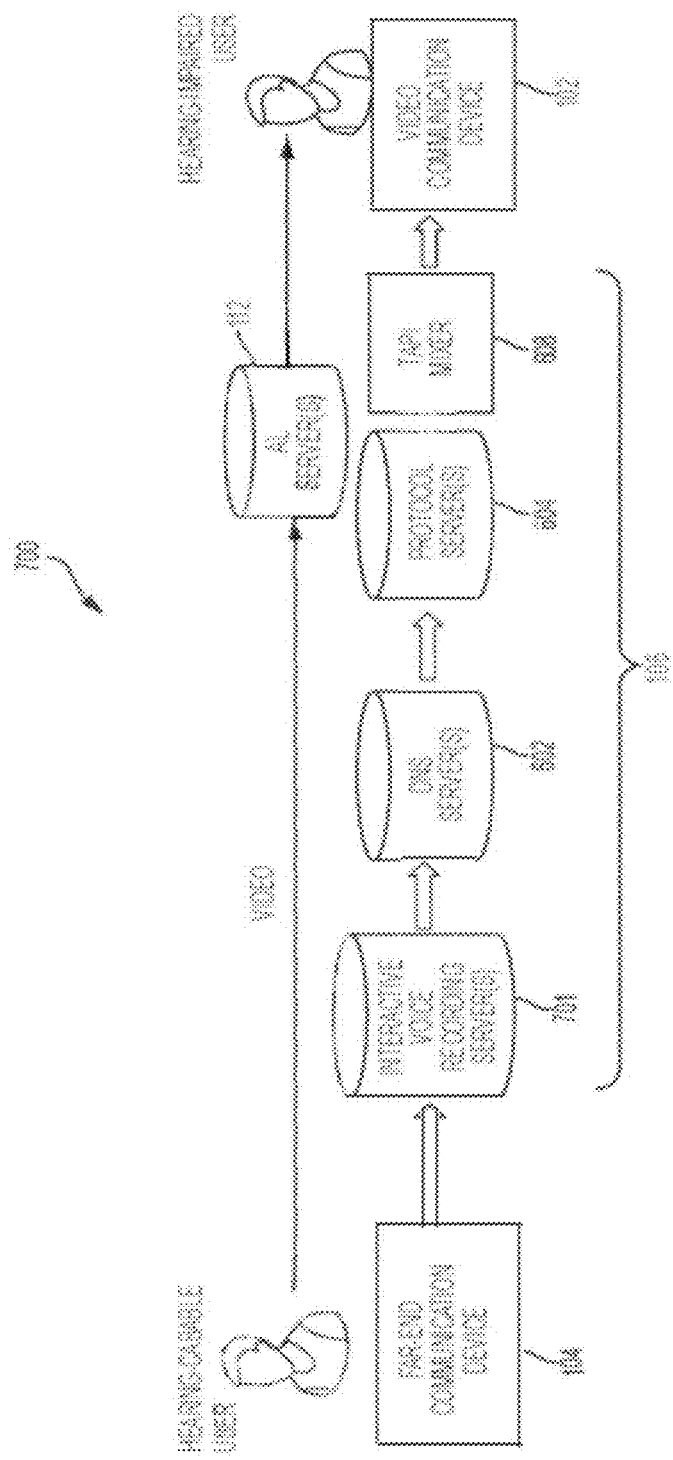

FIGS. 6 and 7 are simplified block diagrams of call flows 600, 700 illustrating additional components of the backend system for the video relay service 106 according to an embodiment of the disclosure. In particular, the call flow shown in FIG. 6 corresponds to a call being initiated by the video communication device 102 associated with the hearing-impaired user. The call flow shown in FIG. 7 corresponds to a call being initiated by the far-end communication device 102 associated with the hearing-impaired user. The backend system of the video relay service 106 may include servers such as DNS server(s) 602, protocol server(s) 604, video relay service server(s) 606, TAPI mixer 608, an interactive voice recording server(s) 701, and AI server(s) 112.

Referring specifically to FIG. 6, a call may be initiated from the video communication device 102 associated with the hearing-impaired user. A call request may be transmitted by the video communication device 102 to the video relay service 106. The call request may be received by a DNS server 602 or other server (e.g., a hold server, routing server, authentication server, etc.). The DNS server 602 is configured to resolve the phone number from the call request and sends the call to a protocol server 604 acting as a gateway to a video relay server 606. The video relay server 606 performs the call management (e.g., routing) between the video communication device 102 and the far-end communication device 104 along with the TAPI mixer that generates the audio to the far-end communication device 104. When the call between the video communication device 102 and the far-end communication device 104 is established through the video relay server 606, the video stream from the video communication device 102 may be transmitted to the AI servers 112 (e.g., via protocols such as SIP, H.323, etc.) for automatic translation of the sign language content to synthesized audio that is transmitted to the far-end communication device 104. In some embodiments, the call request may be initially received by an interactive voice response (IVR) server that may also act as the routing server if interacting with an IVR is desired for the hearing-impaired user to direct the call to the appropriate party.

Referring specifically to FIG. 7, a call may be initiated from the video communication device 102 associated with the hearing-impaired user. A call request may be transmitted by the far-end communication device 102 to the video relay service 106. The call request may be received by an interactive voice recording (IVR) server 701 if such an IVR service is desired for the hearing-capable user to direct the call to the appropriate party. In such an embodiment, the IVR server 701 may perform the call management (e.g., routing) between the video communication device 102 and the far-end communication device 104. The IVR server 701 may communicate the phone number from the call request to the DNS server 602 to resolve the phone number and send the call to a protocol server 604 acting as a gateway for the call. The TAPI mixer that generates the video to the video communication device 104 associated with the hearing-impaired user. When the call between the far-end communication device 104 and the video communication device 104 is established through the IVR server 701 (or other call routing server), the audio stream from the far-end communication device 104 may be transmitted to the AI servers 112 (e.g., via protocols such as SIP, H.323, etc.) for automatic translation of the voice content to text and/or simulated sign language that is transmitted to the video communication device 102 associated with the hearing-impaired user. In some embodiments, the call request may be initially received by the DNS server 602 or other server (e.g., hold server, routing server, authentication server, etc.) if interacting with an IVR is not desired and one or more other server in the call flow may perform that call management functions (e.g., routing) for the call.

Figure 8:
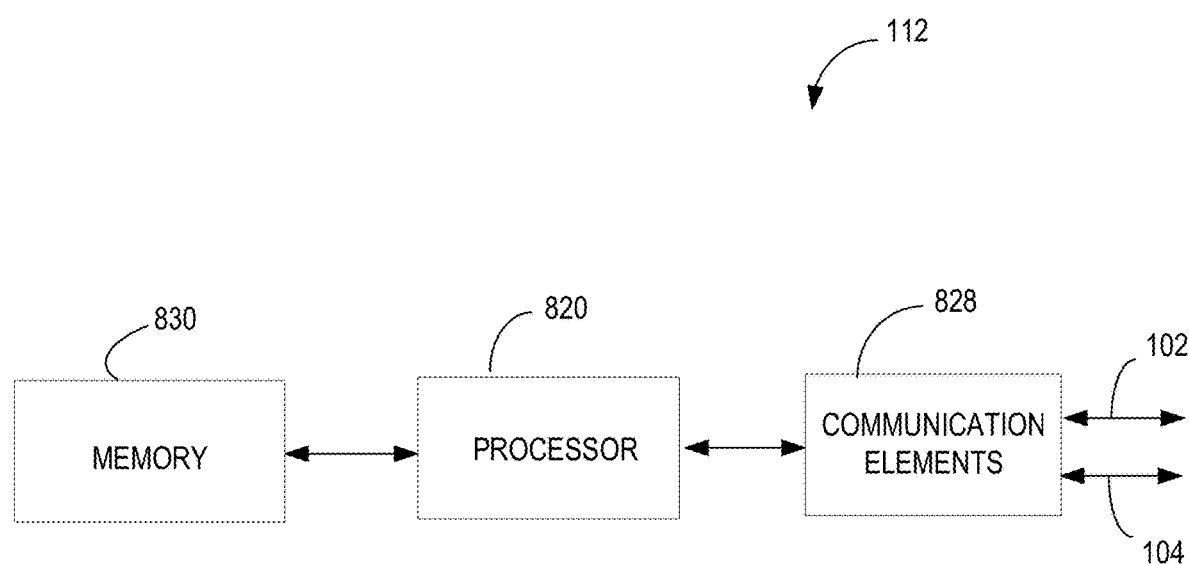
FIG. 8 is a simplified block diagram of an AI server or processor according to an embodiment of the disclosure.

FIG. 8 is a simplified block diagram of an AI server 112 according to an embodiment of the disclosure. The AI server 112 may be one of the AI servers discussed in the examples above. The AI server 112 may include a processor 820 operably coupled with one or more communication elements 828 (e.g., transmitters, receivers, transceivers, and other wired and/or wireless interfaces to send/receive data), and a memory device 830 (e.g., non-volatile storage media and/or volatile media). Thus, the processor 820 may include one or more processors that coordinate the communication between the various devices as well as execute instructions stored in computer-readable media of the memory device 830. In particularly, many parallel processors may be needed to support the real-time requirements of the AI translation application. The memory device 830 may include volatile and non-volatile memory storage for the video communication device 102. For example, the processor 820 may include a video processors and audio processors. The AI server 112 may be configured to receive video and audio from the video communication device 102 and the far-end communication device 104 through the communication elements 828, and the processor 820 may perform the automatic translation services during a live communication session according to instructions stored in the memory device 830 as described herein. The memory device 830 may also store the AI translation databases used in the translation process, which may be updated as described herein.

The processor 820 may be configured to perform parallel image and object pattern recognition by performing a multi-frame analysis for complete ASL signs and phrases in addition to other conventional alphabetic or single frame comparisons of other systems. The AI translation database may include multi-frame images and objects or stored video data correlated to translated words and/or phrases (e.g., as labeled datasets), from which the processor 820 may be configured to compare portions of the live video stream and perform pattern recognition of the multiple frames to generate textual translation of the sign language in context. The comparison performed by the processor 820 may be a multiple frame recording from the live video stream against the stored multiple frame recordings stored in the in the AI translation database. Thus, in some embodiments the processor 820 may include multiple object engines instructing parallel GPUs to compare multiple frame video data from the live video stream with the multiple frame video data of the AI translation database to capture movement from entire words and/or phrases to perform the real-time sign language translation of a live communication session. Parallel DSP processors may also be needed for the real-time audio AI translation requirements. The processor 820 (or a processor of another AI server 112) may also be configured to perform the speech-to-text translation using voice recognition software to perform the real-time transcription (or translation into sign language via simulated avatar) to generate the return far-end information to the video communication device 102.

FIG. 9 is an example of a set of database entries 900 stored in the AI servers as data objects in the AI translation database. The database entries 900 may include video files containing multiple frames of data including a sign language phrase, as well as its corresponding text translation. For example, some video files correspond to individual words (e.g., dog, cat, etc.) or multiple word phrases formed from a combination of signs that translate into a partial sentence (e.g., going to the store) or a full sentence (e.g., How are you today?, I'm sorry, etc.). Words and phrases may be broken down into objects which are small portions of the image. The area of focus for the object may be the face and torso of the person signing. Face and torso recognition may also be used to narrow the region for object analysis in each frame. Face and torso recognition may also be used to identify content indicators. Video files containing multiple frames may be used to identify the speed or abruptness of the signing motion in order to capture certain content identifiers. In certain embodiments, spatial relationships may be looked at to determine whether the motion for a certain sign is exaggerated or not. Each frame may have only a fraction of the sign for "dog" which may require many frames to complete the collection of objects that make up a complete translation of the sign for "dog." Additionally, each frame may have only a fraction of a content indicator associated with the sign language content for "dog." Data files may also be included for individual signs of letters (e.g., A, B, etc.) or numbers (e.g., 1, 2, etc.), and corresponding content indicators to the signs or numbers, in case the sign language to be translated includes the hearing-impaired user spelling something. As shown in FIG. 9, some translations may correspond to multiple different video files, such as to account for different ways or styles for signing that particular word or phrase. See for example, video files 000000005 and 000000006. Somewhat conversely, if the different signing of the same word includes a content indicator which reveals a more precise definition or translation, that sign language content segment may be associated with a more precise translation. For example, video files 000000001-000000004 all contain the signing motion for "dog." However, the 000000001 file may have shown a nondescript signing motion of "dog" whereas video file 000000002 may have shown a more exaggerated or expansive signing motion of "dog," a content indicator indicating a "big dog." Similarly, the 000000003 video file may show the signing of "dog" with a furrowed brow and body language showing aggression. These content indicators along with the signing indicate a "scary dog." Video file 000000004 may have shown the signing of "dog" in a very tight space, a content indicator indicating "tiny dog" Accordingly, in some embodiments, the translation engine databases or data structures may include sign language content stored as video files, with certain video files containing the same sign language content with the addition of one or more content indicators. See for example rows 000000002, 000000003, 000000004, 000000006, and 000000008. In some embodiments, the video files may include a translation for more than one language (e.g., English, Spanish, etc.).

Figure 10:
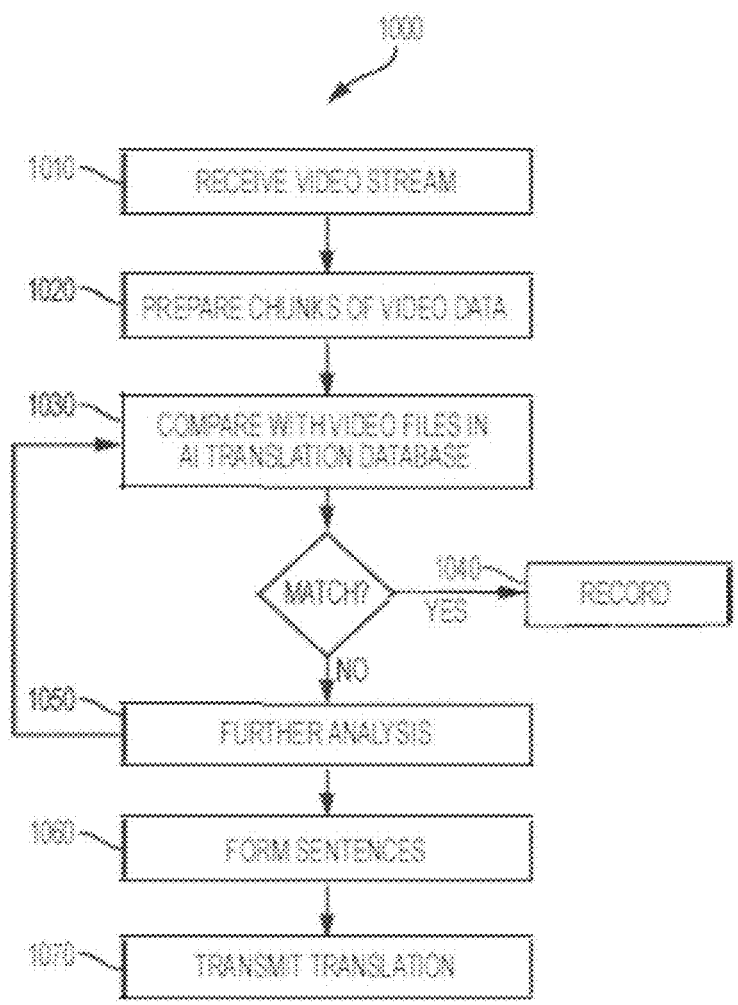
FIG. 10 is a flowchart illustrating a method of performing automatic sign language translation during a real-time communication session according to an embodiment of the disclosure.

FIG. 10 is a flowchart 1000 illustrating a method of performing automatic sign language translation during a real-time communication session according to an embodiment of the disclosure. At operation 1010, a video stream may be received at the VRS service. The video stream may include the near-end video data captured and transmitted by the video communication device associated with the hearing-impaired user. The near-end video data may include the sign language gestures performed by the hearing-impaired user.

At operation 1020, chunks of video data may be prepared and normalized by the AI servers of the VRS service. As used herein throughout, the phrase "chucks of video data" may include, and be interchangeable with, the term "sign language content segment." Sign language content segments may extend over several frames of a video stream. In some embodiments, normalization may occur using facial recognition, torso recognition, and/or other feature recognition systems, and then observing a "pause" between words and phrases. As a result, the AI servers can focus the parallel processing power to address the actual communication and avoid another object in the scene that are not relevant. In some embodiments, the size (e.g., number of frames) of the data chunks may be hard-coded. For example, 15 frames of data may be continuously formed into chunks at a time on a rolling basis. Based on algorithmic or AI Engine performed motion sensing and/or analysis of the video data, forming the data chunks may not occur when it is determined that that hearing-impaired user is not signing in some embodiments. In other embodiments, the size of the data chunks may be determined by the motion sensing or analysis of the video data. For example, the size of the initial data chunk may depend on the duration in which the hearing-impaired user is signing, based on observed pauses, or other dynamically changing lengths of frame data. This could include a long set of frames or multiple shorter sets of frames. In some embodiments, data chunks may include relationships between objects in one or more frames, or of an object or feature across multiple frame. For example, a data chunk may comprise a formula or sequence of location data representing the motion of one or more objects identified by a recognition system over the course of many frames, but without reference to any frame data.

At operation 1030, the data chunks or sign language content segments may be compared with the video files of the AI translation database and/or data chunks derived from those files to identify corresponding words and or phrases. In some embodiments, the contextual clues from surrounding translated words or phrases, or in other words, the lingual context, may be used during the comparison operation to speed up the processing so that the data chunk need not be compared to the entirety of the AI translation database. For example, the translation processing rules may identify relationships between words and combination of words to determine a set of words or phrases that are likely to come next, and then perform a comparison based on those words or phrases first. For example, certain words or phrases may be categorized by subject matter or other relationships to provide lingual contextual clues for determining what grouping of words or phrases to search first or some other hierarchy. Over time, the AI engine may automatically update the database to link these types of relationships or create new categories or links within the database entries in order to further improve the speed and accuracy of translation.

If a match is found, the corresponding word and/or phrase may be recorded at operation 1040. If a match is not found, further analysis of the data chunk may be warranted at operation 1050. For example, if the size of the data chunk was relatively large (e.g., above a threshold level of frames), the larger data chunk may be divided into smaller data chunks for comparison with the AI translation database to determine if subcomponents from a larger phrase may be identified by the AI translation database. If, however, the size of the data chunk was relatively small (e.g., below a threshold level of frames), the larger data chunk may be divided into smaller data chunks for comparison with the AI translation database to determine if more data was needed for the data chunk to be identifiable by the AI translation database. Thus, the number of frames for each data chunk compared to the AI translation database may be adaptable. In some embodiments, the number of frames for a data chunk or sign language content segment may be adaptable based on the determined signing speed of the hearing-impaired user. After a number of failed attempts, the VRS service may attempt to figure out the sign or phrase based on lingual contextual clues of the other translated data chunks. In some embodiments, the VRS service may transmit a message to the video communication device to informing the hearing-impaired user that a particular sign was not determined, which may also prompt the hearing-impaired user more clearly or deliberately perform a sign and/or add their own translation for the unknown sign to the database.

At operation 1060, a sentence may be formed from the recorded translated words and phrases. The VRS service may form the sentence based on grammatical rules to fit the recorded translations into a more grammatically correct sentence. In some embodiments, the lingual contextual clues from the surrounding translations may be used to fill in gaps in the translations as needed. At operation 1070, the translated text or word content may be converted to synthesized audio that is transmitted to the far-end communication device for reproduction.

Figure 11:
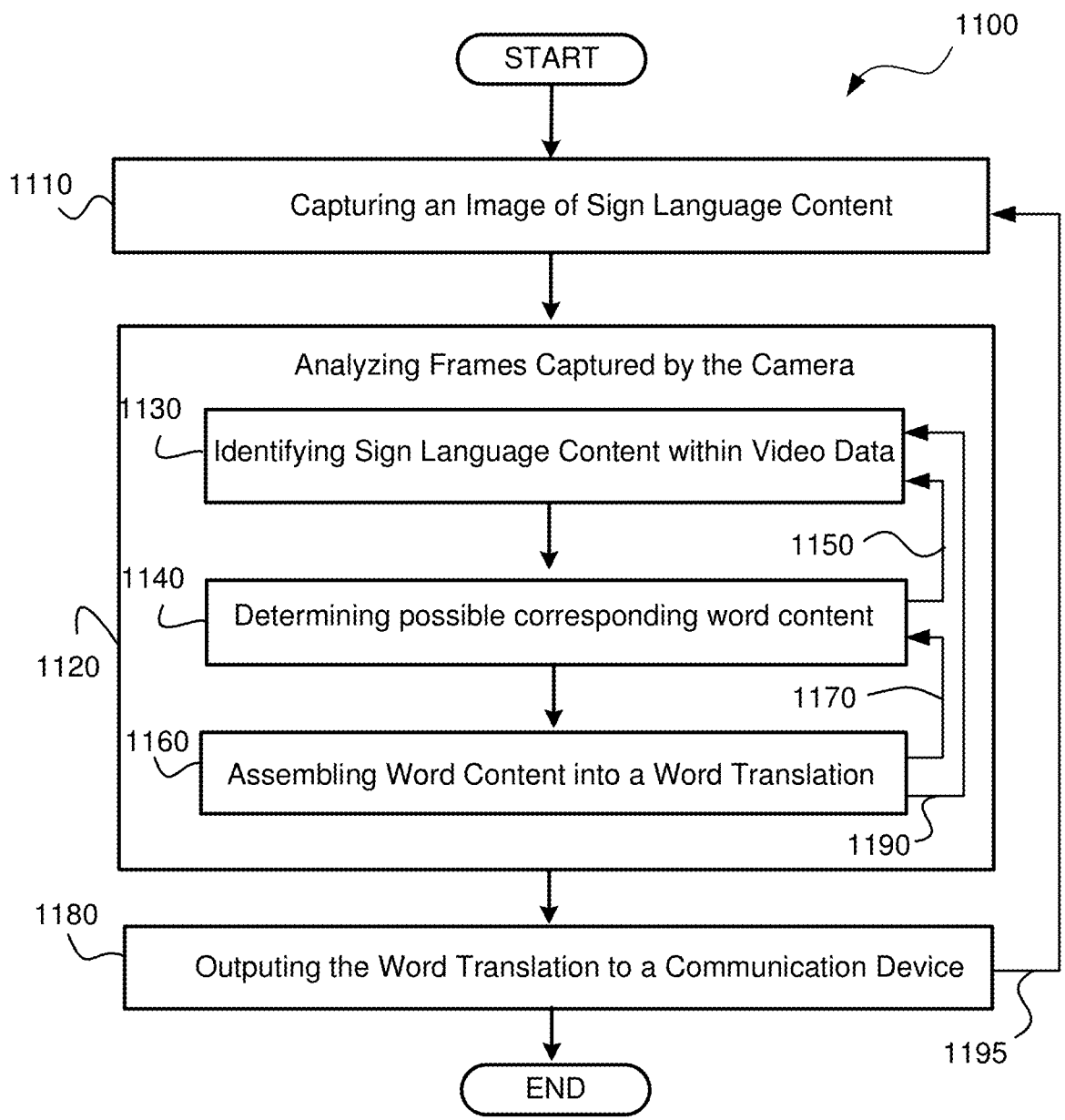
FIG. 11 is a method of translating sign language content into word content by a single user according to an embodiment of the disclosure

Turning now to FIG. 11, a method 1100 of translation includes capturing 1110 an image of sign language content. This may be done using a camera. The camera may be part of a video phone device or system. The camera may also be the camera of a cell phone or mobile tablet. In some embodiments, multiple cameras are used and an image stitching process for images taken from multiple cameras is used to create a 3D model of the sign language content containing a word or phrase. In one embodiment, the image capturing step 1110 may include the step of detecting motion (not shown). This step may also be a standalone step for alerting a camera to prepare to capture an image. Motion detection may be accomplished by any number of ways known in the art.

The method 1100 may include the step of analyzing 1120 one or more frames captured by the camera. The analyzing step 1120 may include identifying 1130 chunks of video data as sign language content segments. Identifying 1120 sign language content segments may be accomplished by the translation engine identifying frames of video data expected to contain words and/or phrases. In one embodiment, this may be accomplished by noting or identifying a pause or other indication in the motion or actions of a signer that may occur at the beginning or end of particular sign language content being conveyed by the signer. For example, the translation engine may be taught or may learn to detect the subtle transitions between the sign motions for "I" or "me" and "happy" as the signer motions the sign language content for "I'm happy." The translation engine may also be taught or learn to detect the stops and starts of finger spelling, which is when the signer spells out a word, as opposed to providing its sign. For example, the signer may give the five signs for the individual letters, h-a-p-p-y, as opposed to providing the single sign for "happy" which the sign language content, which is made with both hands in front, relatively close together, palms facing in, and simultaneously make two circular motions with each hand starting with upward and outward motion circling downward and inward back to the starting point and repeating. In one embodiment, identifying sing language content segment may be accomplished by a translation engine working in concert with an image processor of the camera or other image capturing device.

The step of analyzing frames 1120 may include determining 1140 possible word content corresponding to sign language content segments. This may include a translation engine analyzing features, aspects, images, spatial relationships, data, and the like within sign language content segments. In one embodiment the analysis is accomplished by artificial intelligence or AI analysis. As mentioned above, the AI analysis may include software, firmware, and/or hardware components. The analysis may include extracting various relevant features of the series of frames and/or the sign language content segment captured by the series of frames. These features may include aspects of sign language content. In one embodiment these features include content indicators. The analysis may include the recognition and classification of hand, arm, torso, head, and/or face position or motion. The analysis 1140 may include the recognition and classification of an emotion related to hand, arm, torso, head, and/or face position or motion. The analysis may include recognition and classification of other types of information contained in the sign language content segment, such as, but not limited to, image fragments, motion vectors, motion speeds, foreground segmentation, background segmentation, object special relationships, and the like. The various recognized and/or classified features or other extracted data may be embedded into one or more data structures and coupled with previously embedded data or subsequently embedded data to form a growing data structure for use in subsequent sign language content to word content translations. In one step, analyzing a series of embedded features corresponding to one or more sign language content segments may be analyzed by the translation engine to determine 1140 possible corresponding word content such as, by way of non-limiting example, words, phrases, numbers, and the like. A list of candidate word content may be saved by the system. The steps 1130 and 1140 may be repeated 1150 to continually update or improve the list as new information may become available.

The method may include the step of assembling 1160 word content into a word translation. This step may include analyzing words or phrases and/or groups of words and phrases to assemble 1160 a coherent sentence. This step may include the use of grammar and/or language databases. This step may also be repeated 1170, alone, or in combination 1190 with previous steps, as additional information is received to continually update coherency. In one embodiment, one or more of the steps of analysis may performed simultaneously and/or sequential using AI software analysis. As new input allows for additional analysis, the results and outputs may be continually updated.

Once a coherent sentence is created, the sentence may be sent or output 1180 to the communication device of the user or to the communication device of another person. The output in one embodiment is text. In another embodiment, the output may be audio. In another embodiment, the sentence may be sent to a text to speech converter for output as voice or video. In yet another embodiment, the word content may be translated into another language before being outputted 1180. The overall process or method 1100 may be repeated 1195 as long as input is provided and translation is desired.

It will be appreciated that when the input is word content a similar method is used, but in reverse, with adjustments. If the input word content is voice (from either audio or video), then the input may first need to be sent to a voice to text converter. The text may be embedded into one or more data structures. The text may be combined with subsequently embedded data or subsequently embedded data to form a growing data structure for use in subsequent word content to sign language content translations. The word content may be analyzed by the translation engine to determine possible corresponding sign language content. This step may be repeated as needed to make sure that the input was coherent so that the output will be coherent. The output for this embodiment may be a video representation of sign language content. This may be presented by an avatar motioning sign language. The avatar may also speak the output so that lip readers may benefit. The output may also include text.

Where a definitive translation is not produced, or a coherency threshold is not obtained, this may be noted and the translation engine may be further trained. The results may be added to data structures used by the engine or data structures may be updated by the results of this training. The training may include the review of several streams of content in order to more accurately correlate sign language content, including content indicators, with word content. The training may include a physical interpreter. In one embodiment, this translation engine training may happen in parallel with the original translation session, or it may be a subsequent process.

Figure 12:
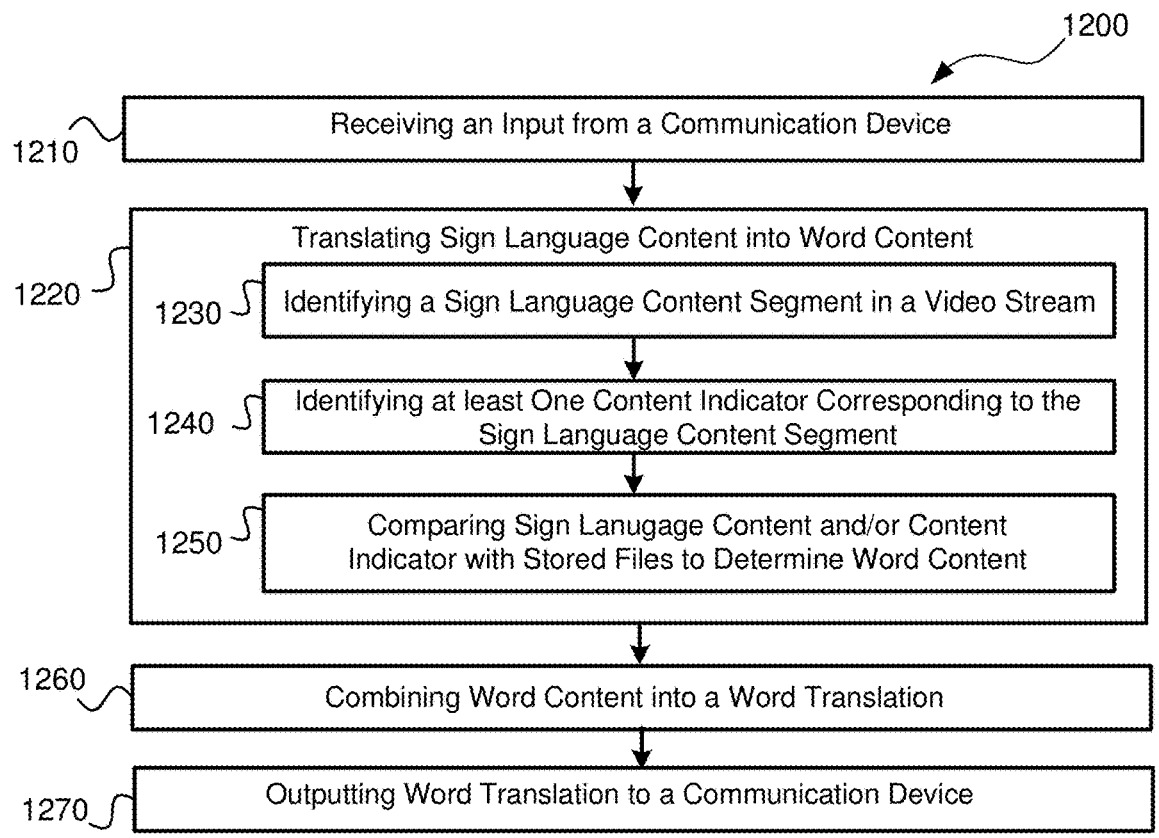
FIG. 12 is a method of translating sign language content into word content by a single user according to an embodiment of the disclosure.

FIG. 12 is a flowchart illustrating a method 1200 of performing automatic language translation during a real-time translation or communication session according to an embodiment of the disclosure. At operation 1210, an input containing sign language content may be received from a communication device. At operation 1220 the sign language content may be translated into word content using a translation engine. Translating 1220 may include the step of identifying 1230 at least one sign language content segment in a video stream. This may be accomplished by observing a pause or other indicator in the input received from the communication device. The method may also include identifying 1240 at least one content indicator corresponding to the sign language content segment. As mentioned herein, the content indicator may include one or more of a head position, a head motion, a face position, a face motion, a body position, a body motion, an arm motion speed, a hand motion speed, an arm motion range, a hand motion range, and other visual cues.

The method of translation may include comparing 1250 at least one sign language content segment and any content indicator corresponding to a sign language content segment with at least one stored file. The stored video file or files include certain aspects of sign language content and/or content indicator representing particular word content. This comparison may be done in any number of ways known in the art, including comparing each frame or parts of a frame that make up the sign language content segment with one or more stored frames representing sign language content and/or content indicators corresponding to particular word content. The stored files may be static or dynamic. The stored files may include various aspects of sign language content expressed as one or more still frames. Each stored file may represent a certain aspect of sign language content and/or content indicator. In one embodiment, the stored files include video files. A correlation between the sign language content in a sign language content segment The word content may then be combined 1260 into a word translation representing sign language content for output on the communication device. The word translation may then be output 1270 to the communication device. In one embodiment, the word content or word translation output maybe text displayed on a display screen. The output may also be an audio file of spoken word content. In yet another embodiment, the word content or word translation may be displayed as a part of a video date displayed on the display of the communication device.

In one embodiment, the method 1200 may be used for translating sign language or word content during a communication session between two communication devices. In this embodiment, the step of receiving input 1210 may include receiving input comprising sign language content and/or content indicators from a first communication device and outputting 1270 word content to a second communication device.

Figure 12A:
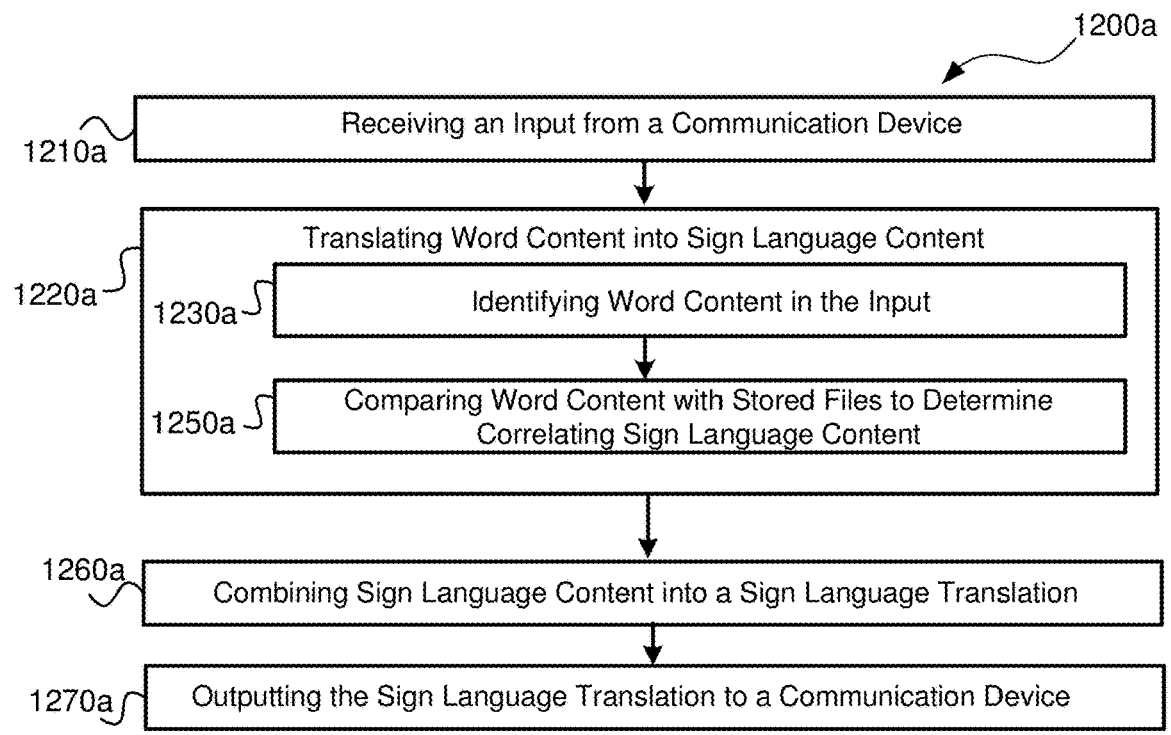
FIG. 12A is a method of translating word content into sign language content by a single user according to an embodiment of the disclosure.

Turning now to FIG. 12*a*, one embodiment of a method of translation 1200*a* includes translating word content into sign language content. In this embodiment, the first step 1210*a* may include receiving an input from a communication device. The method may then include translating 1220*a* word content in the input into sign language content. The step of translating 1220*a* may include identifying 1230*a* word content from one or more of a text input, an audio input, and a video stream. The word content may include at least one of a word, a letter, a number, a symbol, a phrase, a sentence fragment, and a sentence. The method includes the step of comparing 1250*a* identified word content with at least one stored word content file. Each stored word content file correlating with a video representation of one or more sign language content segments and or content indicators. The method may include combining 1260*a* one or more video representations of sign language content into a sign language content translation representing word content for output as a video stream on the communication device.

The method may also include the step receiving 1210*a* word content in various forms from a second communication device and outputting 1270*a* sign language content to a first communication device. The steps of translating sign language content to word content and vice versa using a translation engine may be similar to the steps described in connection with single communication device communication systems.

It will be appreciated that the methods 1200 and 1200*a*, may be used as personal translation devices when operating on a single device. For example, the input may include at least one of sign language content and/or word content. Receiving 1210, 1210*a* the input may include receiving one or more of video stream input, text input and an audio output. In these embodiments, the method 1200, 1200*a* includes translating 1220, 1220*a* the input into one of sign language content and/or word content using a translation engine. The input of sign language content and the output of word content may occur on the same device. In another embodiment, the method may include translating word content input into a communication device by text, audio, or video, into sign language content. The input of word content and the video output of sign language content may also occur on the same device.

Like with other embodiments described herein, the translation engine in the process of FIG. 10 and the methods of FIGS. 11 through 12*a* may be an AI translation engine (see for example FIG. 10 item 1030, or other suitable translation engine platforms capable of carrying out the steps and functionality described herein.

Figure 1A:
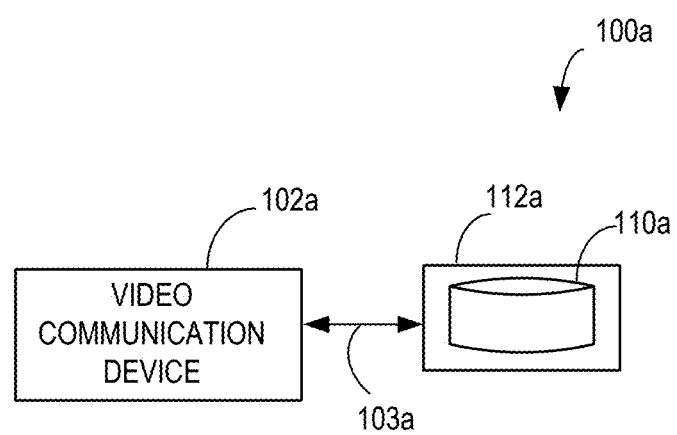
FIG. 1A is a simplified block diagram of a communication system having a single communication device according to an embodiment of the disclosure.
Figure 13:
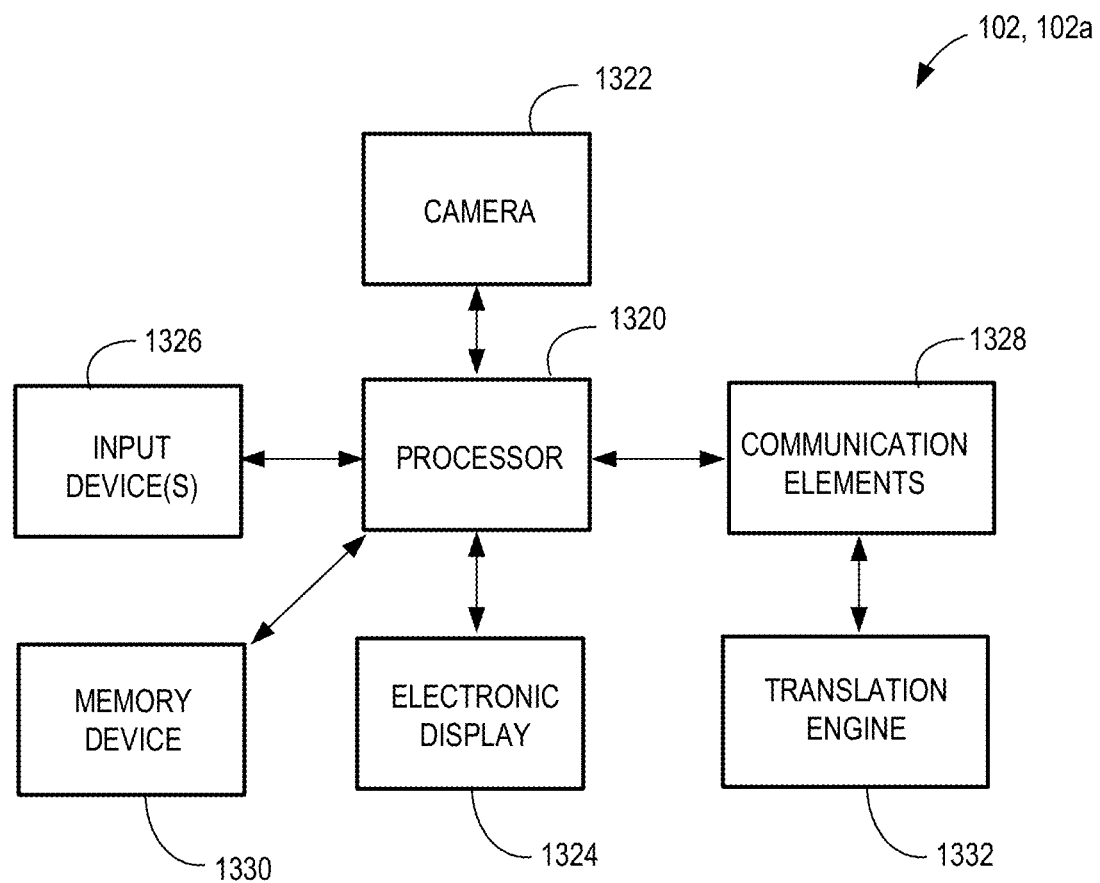
FIG. 13 is a simplified block diagram of a video communication device of FIGS. 1 and/or 2.

FIG. 13 is a simplified block diagram of the video communication device 102 of FIG. 1 or 102*a* of FIG. 1A. The video communication device 102, 102*a* may include a processor 1320 operably coupled with a camera 1322, an electronic display 1324, input devices 1326, one or more communication elements 1328, a translation engine 1332, and a memory device 1330. The video communication device 102, 102*a* may be configured to communicate video data from the camera 1322 through the communication elements 1328 to the translation engine 1332. In the embodiment of FIG. 1, the video data may be sent to a translation engine that is part of, or accessible by, a relay service. In this embodiment, the communication elements 1328 may include telephone networks or other wired or wireless communication networks. In the embodiment of FIG. 1A, the communication elements 1328 may include telephone networks or other wired or wireless communication networks when the translation engine, or part of it, resides on one or more processors 1320 external to the communication device. The communication elements 1328 may also be internal to the communication device when the translation engine, or part of it, resides on one or more processors 1320 internal to the communication device. In this configuration, the communication elements 1328 may include anything that transmits data within a device or between various components of a device. In embodiments where at least a portion of the translation engine resides on a processor 1320 within the communication device, that processor 1320 may be the processor 1320 or a portion of the processor 1320 of the device 102, 102*a* itself.

The device 102, 102*a* may be configured to capture video data of a first user through the camera 1322 that may include sign language content or communication originated by a hearing-impaired user. This data may be translated from sign language content into word content with the corresponding data transmitted through internal and/or external communication elements 1328 to be displayed as text or video on the first user's electronic display 1324. The captured video data of the first user, that may include sign language content, may also be translated from sign language content into word content with the corresponding data being transmitted to a second user through internal and/or external communication elements 1328 to be displayed as text and/or video on the electronic display of a second user or presented as voice through an output device (not shown) of the second user. In certain embodiments, the communication between the first and second users may be through a relay service. It will be appreciated that in these configurations, the devices and systems of the present invention can be used by a hearing-impaired person as a personal translator or as a translator when communicating with another party who may not be hearing-impaired.

The device 102, 102*a* may be configured to capture text, voice, and/or video data of a first user through the camera 1322 and/or input devices 1326 that may include word content originated by a hearing-capable user. This data may be translated from word content into sign language content with the corresponding data transmitted through internal and/or external communication elements 1328 to be displayed as video on the first user's electronic display 1324. The captured text, voice, and/or video data of the first user, that may include word content, may also be translated from word content into sign language content with the corresponding data being transmitted to a second user through internal and/or external communication elements 1328 to be displayed as text and/or video on the electronic display of a second user. The video display may include an avatar signing the translated word content as sign language content and or mouthing the word content. In certain embodiments, the communication between the first and second users may be through a relay service. It will be appreciated that in these configurations, the devices and systems of the present invention can be used by a hearing-capable person as a personal translator or as a translator when communicating with another party who may be hearing-impaired.

The processor 1320 may include multiple processors residing internally and/or externally to the device 102, 102*a* and may coordinate the communication between the various devices or within components of the same device as well as execute instructions stored in computer-readable media of the memory device 1330. The processor 1320 may include one or more processors. For example, the processor 1320 may include a video processor and an audio processor. The processor 1320 may include one or more processors acting as part of a parallel processor. The memory device 1330 may include volatile and non-volatile memory storage for the video communication device 102, 102*a*. The memory device may include multiple memory devices and may be located internally and/or externally to the device 102, 102*a*. The processor 1320 may execute instructions stored in the memory device 1330 to perform the methods, processes and functionalities described herein.

Input devices 1326 may include devices such as a keyboard, touch screen interface, remote control, microphone, infrared camera, motion sensors, or other devices that are configured to receive information that may be used by the processor 1320 to receive inputs that are used by the processor 1320 to determine the signing area and/or operate different functions of the video communication device 102, 102*a*.

In some embodiments, the camera 1322 may be integrated into the video communication device 102, 102*a*. The camera 1322 may be a camera 1322 integrated into a video phone. For example, the camera 1322 may be similar to the cameras described in U.S. Pat. No. 8,976,220 to Maxwell, issued Mar. 10, 2015, the pertinent portions of the disclosure being incorporated herein by this reference. In other embodiments, the camera 1322 may be separate from the video communication device 102, 102*a* but may be operably coupled to the video communication device 102 102*a*. For example, the camera 1322 may be mounted to a display (e.g., a television) such that the display may serve as electronic display 1324 of the video communication device 102, 102*a*. The camera 1322 may be similar to the remote camera described in U.S. Pat. No. 9,432,622, filed Jun. 16, 2015, issued Aug. 30, 2016, the pertinent portions of the disclosure being incorporated herein by this reference. In other embodiments, the camera 1322 may include an image capturing device of one or more of a computer, laptop, phone, tablet, mobile device, PDA, etc. Furthermore, the camera 1322 could be any image capturing device that can be used in conjunction with video communication.

Figure 14:
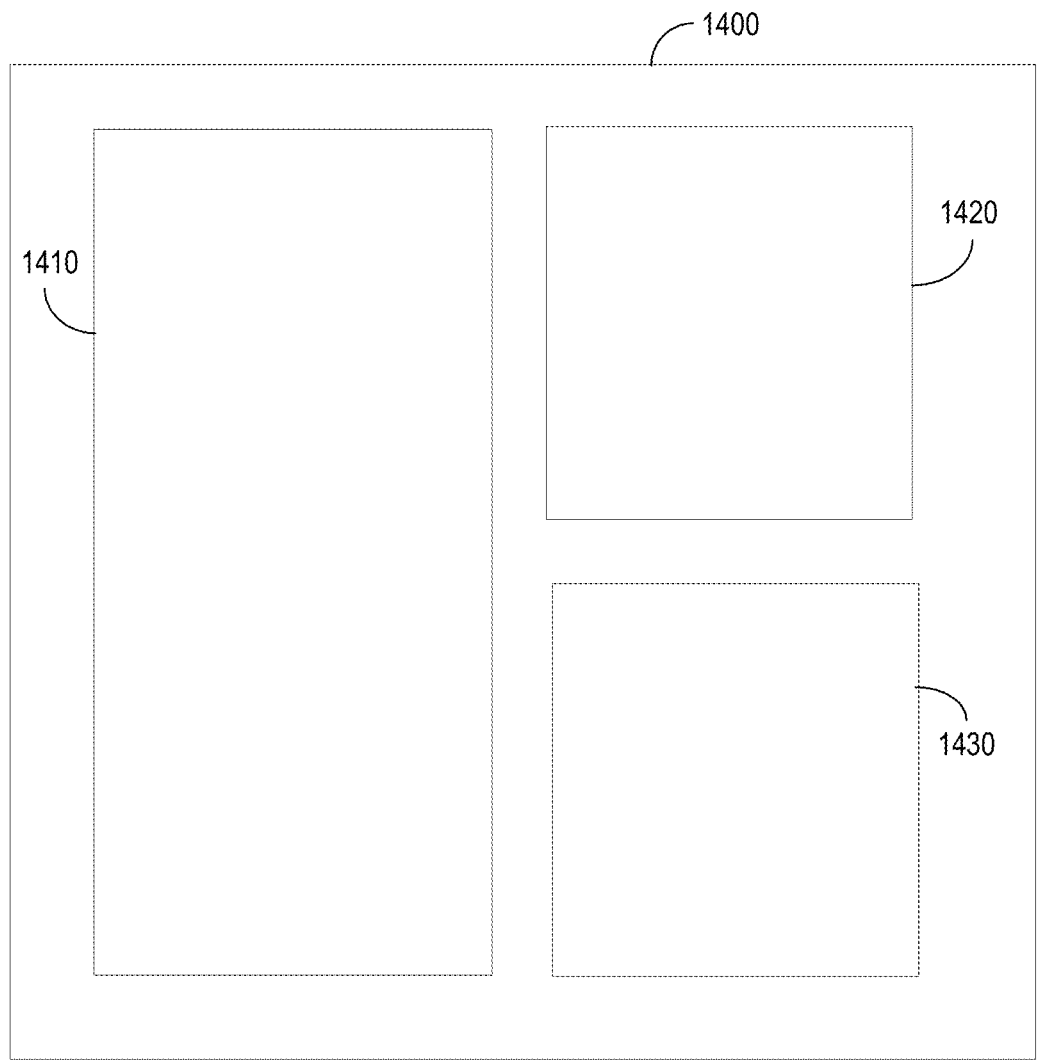
FIGS. 14 and 15 are examples of user interfaces that may be displayed on an electronic display by a video communication device to a hearing-impaired user or a hearing-capable user during a real-time communication session between a hearing-impaired-user and a hearing-capable user, or during a real-time communication session using the single communication device of the hearing-impaired user and/or the hearing-capable user according to embodiments of the disclosure.
Figure 15:
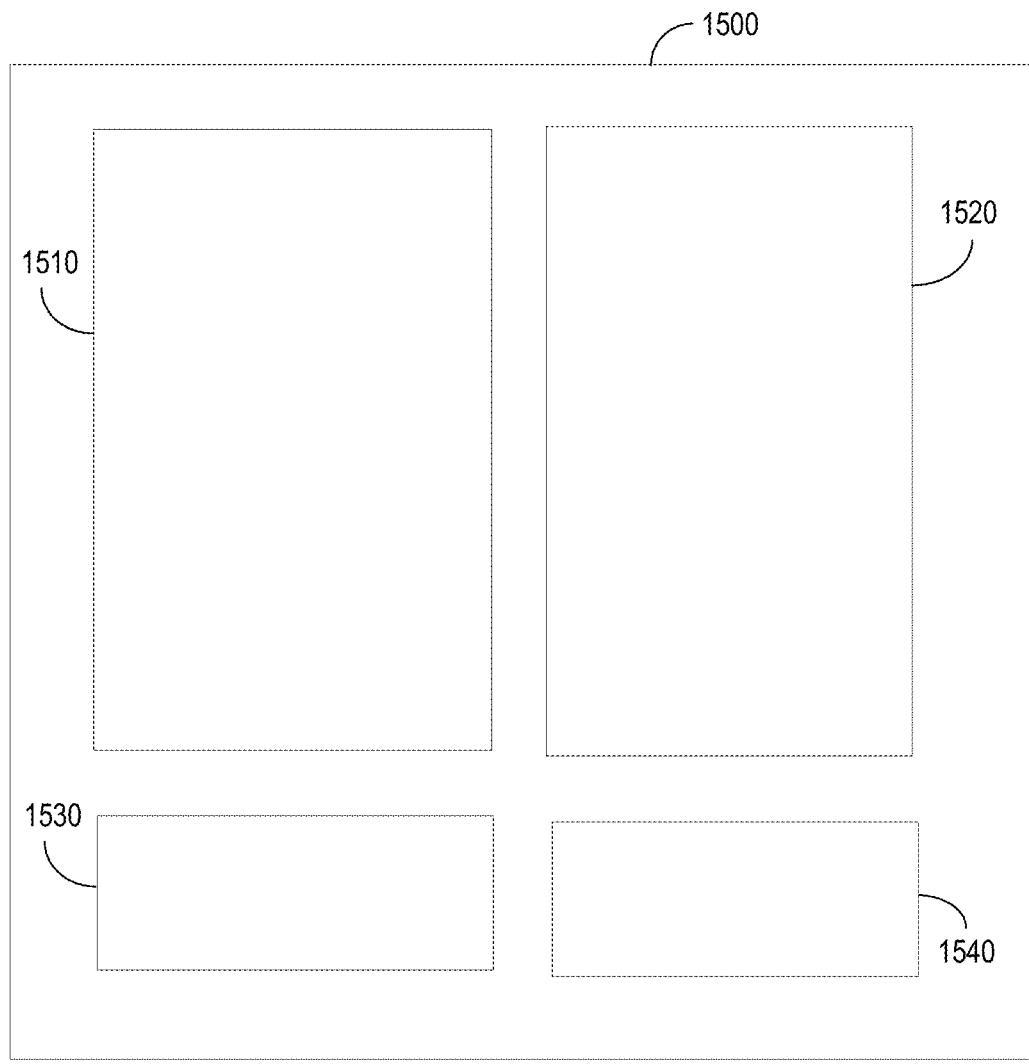

FIGS. 14 and 15 are examples of user interfaces that may be displayed on an electronic display by a video communication device to a hearing-impaired or hearing-capable user during a real-time communication session (i.e., call) with another user according to embodiments of the disclosure or during a real-time translation session by a hearing-capable or hearing-impaired user.

Referring to FIG. 14, the user interface 1400 may include a video area 1410 for displaying the near-end video stream captured by the camera of the video communication device. In other words, the hearing-impaired user's or a hearing-capable user's own video stream may be displayed on the video communication device during the translation. The user interface 1400 also includes a first text area 1420 for displaying the translated text received from the translation engine corresponding to the translation of the user's video, voice, or text input. In some embodiments, the user interface 1400 may include a second text area 1430 for displaying the translated text received from a video relay service corresponding to the translation of the hearing-impaired user's video input. In this configuration, the text translation of the hearing-impaired user's own video stream may be displayed on the video communication device during a call to another user. This feature helps assure that the translation from sign language content to word content is correct, or the best translation. If not, the translation engine can be further trained to better detect and distinguish sign language content and/or content indicators. Communications between user's may in certain embodiments be through a relay service.

Referring to FIG. 15, the user interface 1500 may include a first video area 1510 for displaying a near-end video stream captured by the camera of the video communication device. In other words, the hearing-impaired user's own video stream may be displayed on the video communication device during a call or translation session. The user interface 1500 may also include a second video area 1520 for displaying an avatar received from the translation engine corresponding to a translation of the far-end user's input into an avatar performing sign language. In some embodiments, the user interface 1500 may include a text area 1530 for displaying the translated text received from the translation engine corresponding to the translation of a hearing-impaired user's near-end video. In other words, the text translation of the hearing-impaired user's own video stream may be displayed on the video communication device during a call or translation session. Another text area 1540 may be included to display translated text received from the translation engine corresponding to the translation of the far-end user's audio. Communications between user's may in certain embodiments be through a relay service.

Embodiments of a non-transitory machine-readable storage medium according to the present invention may include a processor capable of executed instructions to perform operations. The instructions may be stored in memory, including machine-readable storage media. The operations may include the methods steps, processes, and functionality described herein.

As a result of the various embodiments of the disclosure, an automated sign language translation system that could determine the begin and ending of a particular sign, may be able to narrow down possible translation option, and use visual cues given by a sign language user to translate the signs into language that can be written, voiced, or otherwise represented. Further, a fully automatic translation of a full communication session between a hearing-impaired user and a hearing-capable user may be achieved in real-time. While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication system, comprising:
   a communication device configured to perform at least one of: capture a video stream, display a video stream, receive a text input, display a text output, receive an audio input, and display an audio output; and
   a translation engine in operable communication with the communication device, the translation engine configured to generate a translation of sign language content contained in a video stream into word content,
   wherein during the generation, the translation engine is configured to determine word content that corresponds to sign language content in at least one sign language content segment of a video stream using contextual data from one or more words previously determined by the translation engine from one or more previous sign language content segments of the video stream and using one or more content indicators from the at least one sign language content segment, the one or more content indicators including a size and/or speed of a motion pattern that is used to make a sign in the sign language content segment that represents a word, an interpretation of the motion pattern as representing the word not being affected by the size and/or speed of the motion pattern.

2. The communication system of claim 1, wherein the one or more content indicators further include one or more of a head position, a head motion, a face position, a face motion, a body position, a body motion, an arm motion speed, a hand motion speed, an arm motion range, and a hand motion range.

3. The communication system of claim 1, wherein the communication device is configured to capture a video stream and display one or more of video stream, a text output, and an audio output.

4. The communication system of claim 1, wherein the one or more content indicators comprises the size of the motion pattern and the speed of the motion pattern.

5. The communication system of claim 1, wherein the translation engine is configured to combine the word content into a word translation representing sign language content for output on the communication device.

6. The communication system of claim 1, wherein the communication device is configured to display a video stream and perform one or more of receive a text input, receive an audio input, and capture a video stream.

7. The communication system of claim 6, wherein the translation engine is configured to generate a translation of second word content contained in one or more of a text input, an audio input, and a video stream into sign language content.

8. The communication system of claim 1, wherein the word content comprises at least one of a word, a letter, a number, a symbol, a phrase, a sentence fragment, and a sentence.

9. The communication system of claim 1, wherein the translation engine is an AI translation engine.

10. The communication system of claim 1, further comprising a plurality of communication devices, at least one of which is configured to capture video stream comprising sign language content, the plurality of communication devices being in operable communication with the translation engine and a communication network, and the plurality of communication devices configured to allow a communication session between multiple people, at least one of whom is hearing-impaired.

11. The communication system of claim 10, wherein the translation engine is configured to automatically generate translations of sign language content from the video stream from a corresponding video communication device associated with a hearing-impaired user during real-time communication sessions without a human sign language interpreter performing sign language translation for the communication.

12. The communication system of claim 11, further comprising a video relay service.

13. A method of performing automated translation, comprising:
   receiving an input from a communication device, the input comprising sign language content;
   translating the input into word content using a translation engine, wherein the translation engine is configured to determine word content that corresponds to sign language content in at least one sign language content segment of a video stream using contextual data from one or more words previously determined by the translation engine from one or more previous sign language content segments of the video stream and using one or more content indicators from the at least one sign language content segment, the one or more content indicators including a size and/or speed of a motion pattern that is used to make a sign in the sign language content segment that represents a word, an interpretation of the motion pattern as representing the word not being affected by the size and/or speed of the motion pattern; and
   outputting word content to a communication device.

14. The method of claim 13, wherein the one or more content indicators further include one or more of a head position, a head motion, a face position, a face motion, a body position, a body motion, an arm motion speed, a hand motion speed, an arm motion range, and a hand motion range.

15. The method of claim 13, wherein the one or more content indicators comprises the size of the motion pattern and the speed of the motion pattern.

16. The method of claim 13, further comprising combining word content into a word translation representing sign language content for output on the communication device.

17. The method of claim 13, wherein the word content comprises at least one of a word, a letter, a number, a symbol, a phrase, a sentence fragment, and a sentence.

18. The method of claim 13, wherein receiving an input from a communication device comprises receiving input comprising of sign language content from a first communication device and outputting word content to a second communication device.

19. The method of claim 13, wherein translating the input into word content using a translation engine comprises translating an input from a first communication device and outputting a translation comprising word content to a second communication device during a real time communication session between the first and second communication devices.

20. The method of claim 13, wherein the translation engine comprises an AI translation engine.

21. The method of claim 13, wherein receiving an input from a communication device comprises a video relay service receiving an input from a first communication device and wherein outputting word content to a communication device comprises a video relay service outputting word content to a second communication device.

22. A non-transitory machine-readable storage medium comprising processor executable instructions that, when executed by a processor of a system, cause the system to perform operations, the operations comprising:

receiving an input from a communication device, the input comprising sign language content;

translating the input into word content using a translation engine, wherein the translation engine is configured to determine word content that corresponds to sign language content in at least one sign language content segment of a video stream using contextual data from one or more words previously determined by the translation engine from one or more previous sign language content segments of the video stream and using one or more content indicators from the at least one sign language content segment, the one or more content indicators including a size and/or speed of a motion pattern that is used to make a sign in the sign language content segment that represents a word, an interpretation of the motion pattern as representing the word not being affected by the size and/or speed of the motion pattern; and outputting word content to a communication device.

23. The non-transitory machine-readable storage medium of claim 22, wherein the one or more content indicators comprises the size of the motion pattern and the speed of the motion pattern.

24. The non-transitory machine-readable storage medium of claim 22, wherein the one or more content indicators further include one or more of a head position, a head motion, a face position, a face motion, a body position, a body motion, an arm motion speed, a hand motion speed, an arm motion range, and a hand motion range.

25. The non-transitory machine-readable storage medium of claim 22, wherein receiving an input from a communication device comprises receiving input comprising of sign language content from a first communication device and outputting word content to a second communication device.

* * * * *